（12) United States Patent
Guan et al.

(10) Patent No.: US 11,350,425 B2
(45) Date of Patent: May 31, 2022

(54) ANTENNA PANEL TRAINING METHOD AND APPARATUS

(71) Applicant: HUAWEI TECHNOLOGIES CO., LTD., Guangdong (CN)

(72) Inventors: Peng Guan, Shenzhen (CN); Xi Zhang, Ottawa (CA); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/162,344

(22) Filed: Jan. 29, 2021

(65) Prior Publication Data

US 2021/0153215 A1 May 20, 2021

Related U.S. Application Data

(63) Continuation of application No. PCT/CN2019/099815, filed on Aug. 8, 2019.

(30) Foreign Application Priority Data

Aug. 10, 2018 (CN) .......................... 201810911112.0

(51) Int. Cl.
*H04W 72/08* (2009.01)
*H04B 7/06* (2006.01)
*H04L 5/00* (2006.01)

(52) U.S. Cl.
CPC ........ *H04W 72/082* (2013.01); *H04B 7/0617* (2013.01); *H04L 5/0048* (2013.01)

(58) Field of Classification Search
CPC . H04W 72/082; H04B 7/0617; H04B 7/0691; H04B 7/0695; H04B 7/0874; H04B 7/088; H04L 5/0048; H04L 67/303; H04L 67/34; H04L 1/0803
See application file for complete search history.

(56) References Cited

U.S. PATENT DOCUMENTS

| 5,852,630 | A | * | 12/1998 | Langberg ............ H04L 27/2647 375/219 |
| 10,686,573 | B2 | * | 6/2020 | Jung ...................... H04L 5/0023 |
| 2009/0121935 | A1 | * | 5/2009 | Xia ....................... H01Q 3/2605 342/377 |
| 2018/0183507 | A1 |  | 6/2018 | Franz et al. |

(Continued)

FOREIGN PATENT DOCUMENTS

| CN | 106549883 A | 3/2017 |
| CN | 107733479 A | 2/2018 |

(Continued)

OTHER PUBLICATIONS

Extended European Search Report issued in European Application No. 19848068.3 dated Jul. 7, 2021, 12 pages.

(Continued)

*Primary Examiner* — Siu M Lee
(74) *Attorney, Agent, or Firm* — Fish & Richardson P.C.

(57) ABSTRACT

This application provides antenna panel training methods and apparatuses. One method includes: determining, by a network device, configuration information that comprises information about a reference signal resource set for training an antenna panel of a terminal device; and sending, by the network device, the configuration information to the terminal device.

20 Claims, 8 Drawing Sheets

(56) References Cited

U.S. PATENT DOCUMENTS

| | | | | |
|---|---|---|---|---|
| 2018/0206132 A1* | 7/2018 | Guo | ................. | H04W 72/0473 |
| 2020/0021413 A1 | 1/2020 | Park et al. | | |
| 2020/0028563 A1* | 1/2020 | Gao | ..................... | H04L 5/0091 |

FOREIGN PATENT DOCUMENTS

| | | |
|---|---|---|
| CN | 107888352 A | 4/2018 |
| CN | 108023618 A | 5/2018 |
| CN | 108023628 A | 5/2018 |
| CN | 108092698 A | 5/2018 |
| CN | 108092700 A | 5/2018 |
| CN | 108111278 A | 6/2018 |
| EP | 3780847 A1 | 2/2021 |
| WO | 2018141261 A1 | 8/2018 |
| WO | 2018143688 A1 | 8/2018 |
| WO | 2018203104 A1 | 11/2018 |

OTHER PUBLICATIONS

3GPP TS 38.211 V15.2.0 (Jun. 2018), "3rd Generation Partnership Project; Technical Specification Group Radio Access Network; NR; Physical channels and modulation (Release 15)," Jun. 2018, 96 pages.

3GPP TS 38.212 V15.2.0 (Jun. 2018), "3rd Generation Partnership Project; Technical Specification Group Radio Access Network; NR; Multiplexing and channel coding (Release 15)," Jun. 2018, 98 pages.

3GPP TS 38.213 V15.2.0 (Jun. 2018), "3rd Generation Partnership Project; Technical Specification Group Radio Access Network; NR; Physical layer procedures for control (Release 15)," Jun. 2018, 99 pages.

3GPP TS 38.331 V15.2.0 (Jun. 2018), "3rd Generation Partnership Project; Technical Specification Group Radio Access Network; NR; Radio Resource Control (RRC) protocol specification (Release 15)," Jun. 2018, 304 pages.

InterDigital, Inc., "Remaining issues on beam management," 3GPP TSG RAN WG1 Meeting AH 1801, R1-1800734, Vancouver, Canada, Jan. 22-26, 2018, 6 pages.

Office Action issued in Chinese Application No. 201810911112.0 dated Jun. 12, 2020, 10 pages.

PCT International Search Report and Written Opinion issued in International Application No. PCT/CN2019/099815 dated Oct. 29, 2019, 15 pages (with English translation).

Sony, "Considerations on UL beam management," 3GPP TSG RAN WG1 Meeting #89bis, R1-1710852, Qingdao, China, Jun. 27-30, 2017, 3 pages.

* cited by examiner

ANTENNA PANEL TRAINING METHOD AND APPARATUS

CROSS-REFERENCE TO RELATED APPLICATIONS

This application is a continuation of International Application No. PCT/CN2019/099815, filed on Aug. 8, 2019, which claims priority to Chinese Patent Application No. 201810911112.0, filed on Aug. 10, 2018. The disclosures of the aforementioned applications are hereby incorporated by reference in their entireties.

TECHNICAL FIELD

This application relates to the communications field, and specifically, to an antenna panel training method and an apparatus.

BACKGROUND

Wireless communication between a network device and a terminal device is implemented by using an antenna, that is, a communication signal is received and sent by using the antenna. Both the network device and the terminal device are provided with antenna elements. A plurality of antenna elements may be integrated on one panel, and the panel is referred to as an antenna panel. One antenna panel may output one or more beams.

In a conventional technology, a terminal device has one antenna panel. To cover a plurality of different directions, a plurality of antenna panels may be disposed on the terminal device. For example, beams that are output on all the antenna panels roughly face one direction. When the plurality of antenna panels are used simultaneously, the terminal device may implement omnidirectional sending and receiving.

During antenna-based communication between the terminal device and a network device, some beams of the terminal device have good quality, and some beams of the terminal device have poor quality. Generally, before performing antenna-based data transmission with the network device, the terminal device performs beam training, to select a beam with relatively good quality.

Currently, there is a related beam training solution for a scenario in which a terminal device has one antenna panel. However, there is no solution for training and managing a plurality of antenna panels for a scenario in which a terminal device has a plurality of antenna panels.

SUMMARY

This application provides an antenna panel training method and an apparatus, to manage a plurality of antenna panels of a terminal device.

According to a first aspect, an antenna panel management method is provided. The method includes: A network device determines configuration information, where the configuration information includes information about a reference signal resource set, and the reference signal resource set is used to train an antenna panel of a terminal device. The network device sends the configuration information to the terminal device.

In this application, the network device configures, for the terminal device, the reference signal resource set used to train the antenna panel of the terminal device, so that the terminal device can train the antenna panel of the terminal device, thereby helping the terminal device manage a plurality of antenna panels of the terminal device.

With reference to the first aspect, in a possible implementation of the first aspect, the configuration information includes training mode information, and the training mode information is used to indicate a training mode of the antenna panel of the terminal device.

With reference to the first aspect, in a possible implementation of the first aspect, the training mode of the antenna panel of the terminal device includes at least one of the following: a single-antenna panel mode, a multi-antenna panel mode, or a specified-antenna panel mode.

Optionally, the network device may notify the terminal device of the training mode information explicitly or implicitly.

The network device configures a single-antenna panel mode for the terminal device, so that the terminal device trains only a currently used antenna panel. The single-antenna panel mode is applicable to a scenario in which a transmit or receive antenna panel of the terminal device has been determined and an optimal beam needs to be further determined. The network device configures a multi-antenna panel mode for the terminal device, so that the terminal device can train all antenna panels of the terminal device. The multi-antenna panel mode is applicable to a scenario in which the terminal device just accesses a network and all the antenna panels need to be trained. The network device configures a specified-antenna panel mode for the terminal device, so that the terminal device trains only an antenna panel specified by the network device.

Therefore, in the solution provided in this application, the network device configures a plurality of antenna panel training modes for the terminal device, so that the terminal device can train an antenna panel of the terminal device in different scenarios by using a relatively appropriate training mode, thereby flexibly training and managing a plurality of antenna panels of the terminal device.

With reference to the first aspect, in a possible implementation of the first aspect, the reference signal resource set includes a plurality of reference signal resource sets, and each reference signal resource set is used to train one antenna panel of the terminal device.

With reference to the first aspect, in a possible implementation of the first aspect, the configuration information includes antenna panel indication information, and the antenna panel indication information is used to indicate information about an antenna panel that needs to be trained.

Optionally, information about each reference signal resource set corresponds to indication information of one antenna panel. In other words, an antenna panel that needs to be trained is indirectly indicated by using a configured resource set.

Optionally, the antenna panel indication information includes indication information of one antenna panel or indication information of one group of antenna panels. In other words, the configuration information includes information used to explicitly indicate an antenna panel that needs to be trained.

With reference to the first aspect, in a possible implementation of the first aspect, the configuration information further includes first trigger information, and the first trigger information is used to activate the reference signal resource set.

With reference to the first aspect, in a possible implementation of the first aspect, the reference signal includes at least one of the following: an uplink reference signal or a downlink reference signal.

With reference to the first aspect, in a possible implementation of the first aspect, the reference signal includes an uplink reference signal. The method further includes: The network device determines a time interval at which the uplink reference signal is sent by using different antenna panels of the terminal device, where the time interval at which the uplink reference signal is sent by using different antenna panels of the terminal device is greater than a time required by the terminal device to switch between different antenna panels.

Optionally, the method further includes: The network device sends, to the terminal device, the time interval at which the uplink reference signal is sent by using different antenna panels of the terminal device.

With reference to the first aspect, in a possible implementation of the first aspect, the reference signal includes an uplink reference signal. The method further includes: The network device sends, to the terminal device, a time interval at which the uplink reference signal is sent by using different antenna panels of the terminal device, where the time interval is greater than a time required by the terminal device to switch between different antenna panels.

With reference to the first aspect, in a possible implementation of the first aspect, the reference signal includes a downlink reference signal and an uplink reference signal, the reference signal resource set includes a downlink reference signal resource set and an uplink reference signal resource set, and the configuration information further includes second trigger information, where the second trigger information is used to indicate a binding relationship between the downlink reference signal resource set and the uplink reference signal resource set, and/or is used to notify the terminal device of a time difference, and the time difference represents a time interval between a time at which the terminal device receives the last symbol in the downlink reference signal and a time at which the terminal device sends the first symbol in the uplink reference signal, or the time difference represents a time interval between a time at which the terminal device sends the last symbol in the uplink reference signal and a time at which the terminal device receives the first symbol in the downlink reference signal.

With reference to the first aspect, in a possible implementation of the first aspect, the method further includes: The network device sends the downlink reference signal to the terminal device by using a resource in the downlink reference signal resource sett. The network device receives the uplink reference signal sent by the terminal device by using a resource in the uplink reference signal resource set and by using an optimal antenna panel of the terminal device, where the optimal antenna panel of the terminal device is obtained by the terminal device by performing training by using the downlink reference signal.

In this application, a transmit antenna panel of the terminal device is trained by using both the uplink reference signal and the downlink reference signal, so that both an optimal transmit antenna and an optimal transmit beam can be selected, thereby reducing power consumption of the terminal device while ensuring communication quality.

In this application, the network device can effectively obtain related information of an optimal transmit antenna panel of the terminal device by controlling training of the transmit antenna panel of the terminal device. During subsequent communication, the network device may indicate the terminal device to use only the optimal transmit antenna panel to perform uplink communication, so that power consumption of the terminal device can be reduced while communication quality is ensured.

With reference to the first aspect, in a possible implementation of the first aspect, the uplink reference signal is a sounding reference signal (SRS), and the downlink reference signal is a channel state information reference signal (CSI-RS).

With reference to the first aspect, in a possible implementation of the first aspect, the method further includes: The network device receives antenna panel capability information sent by the terminal device, where the antenna panel capability information is used to indicate at least one of the following:

a quantity of antenna panels of the terminal device, where the quantity of antenna panels of the terminal device includes a quantity of transmit antenna panels of the terminal device, and/or a quantity of receive antenna panels of the terminal device;

a quantity of receive antenna panels or transmit antenna panels that can be simultaneously used by the terminal device;

a quantity of beams that can be processed by using each antenna panel of the terminal device, where the quantity of beams that can be processed by using each antenna panel of the terminal device includes a quantity of beams that can be received by using each receive antenna panel of the terminal device, or a quantity of beams that can be sent by using each transmit antenna panel of the terminal device;

a quantity of receive antenna panel groups of the terminal device, and/or a quantity of receive antenna panels included in each receive antenna panel group and/or identifiers of the receive antenna panels;

a quantity of transmit antenna panel groups of the terminal device, and/or a quantity of transmit antenna panels included in each transmit antenna panel group and/or identifiers of the transmit antenna panels;

at least one of the following capabilities of the terminal device to switch between receive antenna panels: a time interval at which the terminal device switches between receive antenna panels, and a quantity of times that the terminal device switches between receive antenna panels within a preset time period;

at least one of the following capabilities of the terminal device to switch between transmit antenna panels: a time interval at which the terminal device switches between transmit antenna panels, and a quantity of times that the terminal device switches between transmit antenna panels within a preset time period;

at least one of the following capabilities of the terminal device to switch from a receive antenna panel to a transmit antenna panel:

a time interval at which the terminal device switches from a receive mode to a transmit mode when the receive antenna panel and the transmit antenna panel are a same antenna panel, a time interval at which the terminal device switches from a receive mode to a transmit mode when the receive antenna panel and the transmit antenna panel are different antenna panels, a quantity of times that the terminal device switches from a receive mode to a transmit mode on a same antenna panel within a preset time period, and a quantity of times that the terminal device switches from a receive mode to a transmit mode on different antenna panels within a preset time period;

at least one of the following capabilities of the terminal device to switch between transmit antenna panels: a time interval at which the terminal device switches between transmit antenna panels, and a quantity of times that the terminal device switches between transmit antenna panels within a preset time period; and at least one of the following capabilities of the terminal device to switch from a transmit antenna panel to a receive antenna panel:

a time interval at which the terminal device switches from a transmit mode to a receive mode when the receive antenna panel and the transmit antenna panel are a same antenna panel, a time interval at which the terminal device switches from a transmit mode to a receive mode when the receive antenna panel and the transmit antenna panel are different antenna panels, a quantity of times that the terminal device switches from a transmit mode to a receive mode on a same antenna panel within a preset time period, and a quantity of times that the terminal device switches from a transmit mode to a receive mode on different antenna panels within a preset time period.

Optionally, the configuration information sent by the network device may be determined based on the antenna panel capability information. For example, the information about the reference signal resource set that is included in the configuration information is related to the antenna panel capability information.

In this application, the terminal device reports an antenna panel-related capability to the network device, so that the network device can accurately obtain information about an antenna panel on a terminal device side, thereby helping the network device manage a plurality of antenna panels of the terminal device, for example, a quantity of resources that are configured for the terminal device to perform antenna panel management and beam management, or a method for configuring a time interval between resources used for antenna panel/beam training.

The network device may learn of information about an optimal transmit antenna panel of the terminal device based on the antenna panel-related capability reported by the terminal device, to ensure uplink transmission performance. In addition, the network device may indicate the terminal device to use an optimal antenna panel to perform uplink transmission. Compared with the prior art in which the terminal device always opens a plurality of antenna panels, the solution in this application can effectively reduce power consumption of the terminal device.

With reference to the first aspect, in a possible implementation of the first aspect, the antenna panel capability information includes indication information of a quantity of antenna panels of the terminal device, and the indication information of the quantity of antenna panels of the terminal device includes at least one of the following information: a quantity of beam groups of the terminal device, a quantity of uplink reference signal resource sets of the terminal device, and a quantity of downlink reference signal resource sets of the terminal device; and/or the antenna panel capability information includes indication information of a quantity of beams that can be processed by using each antenna panel of the terminal device, and the indication information of the quantity of beams that can be processed by using each antenna panel of the terminal device includes a quantity of resources included in each downlink reference signal resource set of the terminal device, or a quantity of resources included in each uplink reference signal resource set of the terminal device.

According to a second aspect, an antenna panel management method is provided. The method includes: A terminal device obtains configuration information from a network device, where the configuration information includes information about a reference signal resource set, and the reference signal resource set is used to train an antenna panel of the terminal device. The terminal device trains the antenna panel of the terminal device by using a resource in the reference signal resource set.

In this application, the network device configures the resource used to train the antenna panel of the terminal device, so that the terminal device trains the antenna panel based on the configured resource.

With reference to the second aspect, in a possible implementation of the second aspect, the configuration information includes training mode information, and the training mode information is used to indicate a training mode of the antenna panel of the terminal device.

With reference to the second aspect, in a possible implementation of the second aspect, the training mode of the antenna panel of the terminal device includes at least one of the following: a single-antenna panel mode, a multi-antenna panel mode, or a specified-antenna panel mode.

In this application, the network device further configures the training mode information used to indicate the mode fix training the antenna panel by the terminal device, so that the terminal device trains the antenna panel based on the training mode information.

With reference to the second aspect, in a possible implementation of the second aspect, the training mode of the antenna panel of the terminal device is a single-antenna panel mode. That the terminal device trains the antenna panel of the terminal device by using a resource in the reference signal resource set includes: The terminal device trains a currently used antenna panel of the terminal device by using the resource in the reference signal resource set.

With reference to the second aspect, in a possible implementation of the second aspect, the training mode of the antenna panel of the terminal device is a multi-antenna panel mode. That the terminal device trains the antenna panel of the terminal device by using a resource in the reference signal resource set includes: The terminal device trains all antenna panels of the terminal device by using the resource in the reference signal resource set.

With reference to the second aspect, in a possible implementation of the second aspect, the training mode of the antenna panel of the terminal device is a specified-antenna panel mode. That the terminal device trains the antenna panel of the terminal device by using a resource in the reference signal resource set includes: The terminal device trains, by using the resource in the reference signal resource set, one or more antenna panels specified by the network device.

With reference to the second aspect, in a possible implementation of the second aspect, the reference signal resource set includes one or more reference signal resource sets, and each reference signal resource set is used to train one antenna panel of the terminal device.

With reference to the second aspect, in a possible implementation of the second aspect, the configuration information includes antenna panel indication information, and the antenna panel indication information is used to indicate information about an antenna panel that needs to be trained.

Optionally, information about each reference signal resource set corresponds to indication information of one antenna panel. In other words, an antenna panel that needs to be trained is indirectly indicated by using a configured resource.

Optionally, the antenna panel indication information includes indication information of one antenna panel or indication information of one group of antenna panels. In other words, the configuration information includes information used to explicitly indicate an antenna panel that needs to be trained.

With reference to the second aspect, in a possible implementation of the second aspect, the configuration information further includes first trigger information, and the first trigger information is used to activate the reference signal resource set.

With reference to the second aspect, in a possible implementation of the second aspect, the reference signal includes at least one of the following: an uplink reference signal or a downlink reference signal.

With reference to the second aspect, in a possible implementation of the second aspect, the reference signal includes an uplink reference signal. The method further includes: The terminal device obtains, from the network device, a time interval at which the uplink reference signal is sent by using different antenna panels of the terminal device, where the time interval at which the uplink reference signal is sent by using different antenna panels of the terminal device is greater than a time required by the terminal device to switch between different antenna panels.

With reference to the second aspect, in a possible implementation of the second aspect, the reference signal includes a downlink reference signal and an uplink reference signal, the reference signal resource set includes a downlink reference signal resource set and an uplink reference signal resource set, and the configuration information further includes second trigger information, where the second trigger information is used to indicate a binding relationship between the downlink reference signal resource set and the uplink reference signal resource set, and/or is used to notify the terminal device of a time difference, and the time difference represents a time interval between a time at which the terminal device receives the last symbol in the downlink reference signal and a time at which the terminal device sends the first symbol in the uplink reference signal, or the time difference represents a time interval between a time at which the terminal device sends the last symbol in the uplink reference signal and a time at which the terminal device receives the first symbol in the downlink reference signal.

With reference to the second aspect, in a possible implementation of the second aspect, the method further includes: The terminal device receives the downlink reference signal sent by the network device by using a resource in the downlink reference signal resource set. The terminal device obtains an optimal antenna panel of the terminal device by using the received downlink reference signal. The terminal device sends the uplink reference signal by using a resource in the uplink reference signal resource set and by using the optimal antenna panel of the terminal device.

With reference to the second aspect, in a possible implementation of the second aspect, the uplink reference signal is an SRS, and the downlink reference signal is a CSI-RS.

With reference to the second aspect, in a possible implementation of the second aspect, the method further includes: The terminal device sends antenna panel capability information to the network device, where the antenna panel capability information is used to indicate at least one of the following:

a quantity of antenna panels of the terminal device, where the quantity of antenna panels of the terminal device includes a quantity of transmit antenna panels of the terminal device, and/or a quantity of receive antenna panels of the terminal device;

a quantity of receive antenna panels or transmit antenna panels that can be simultaneously used by the terminal device;

a quantity of beams that can be processed by using each antenna panel of the terminal device, where the quantity of beams that can be processed by using each antenna panel of the terminal device includes a quantity of beams that can be received by using each receive antenna panel of the terminal device, or a quantity of beams that can be sent by using each transmit antenna panel of the terminal device;

a quantity of receive antenna panel groups of the terminal device, and/or a quantity of receive antenna panels included in each receive antenna panel group and/or identifiers of the receive antenna panels;

a quantity of transmit antenna panel groups of the terminal device, and/or a quantity of transmit antenna panels included in each transmit antenna panel group and/or identifiers of the transmit antenna panels;

at least one of the following capabilities of the terminal device to switch between receive antenna panels: a time interval at which the terminal device switches between receive antenna panels, and a quantity of times that the terminal device switches between receive antenna panels within a preset time period;

at least one of the following capabilities of the terminal device to switch between transmit antenna panels: a time interval at which the terminal device switches between transmit antenna panels, and a quantity of times that the terminal device switches between transmit antenna panels within a preset time period;

at least one of the following capabilities of the terminal device to switch from a receive antenna panel to a transmit antenna panel:

a time interval at which the terminal device switches from a receive mode to a transmit mode when the receive antenna panel and the transmit antenna panel are a same antenna panel, a time interval at which the terminal device switches from a receive mode to a transmit mode when the receive antenna panel and the transmit antenna panel are different antenna panels;

a quantity of times that the terminal device switches from a receive mode to a transmit mode on a same antenna panel within a preset time period, and a quantity of times that the terminal device switches from a receive mode to a transmit mode on different antenna panels within a preset time period;

at least one of the following capabilities of the terminal device to switch between transmit antenna panels: a time interval at which the terminal device switches between transmit antenna panels, and a quantity of times that the terminal device switches between transmit antenna panels within a preset time period; and at least one of the following capabilities of the terminal device to switch from a transmit antenna panel to a receive antenna panel:

a time interval at which the terminal device switches from a transmit mode to a receive mode when the receive antenna panel and the transmit antenna panel are a same antenna panel, a time interval at which the terminal device switches from a transmit mode to a receive mode when the receive antenna panel and the transmit antenna panel are different antenna panels, a quantity of times that the terminal device switches from a transmit mode to a receive mode on a same antenna panel within a preset time period, and a quantity of times that the terminal device switches from a transmit mode to a receive mode on different antenna panels within a preset time period.

Optionally, the information about the reference signal resource set in the configuration information determined by the network device is determined based on the antenna panel capability information.

With reference to the second aspect, in a possible implementation of the second aspect, the antenna panel capability information includes indication information of a quantity of antenna panels of the terminal device, and the indication information of the quantity of antenna panels of the terminal device includes at least one of the following information: a quantity of beam groups of the terminal device, a quantity of uplink reference signal resource sets of the terminal device, and a quantity of downlink reference signal resource sets of the terminal device; and/or the antenna panel capability information includes indication information of a quantity of beams that can be processed by using each antenna panel of the terminal device, and the indication information of the quantity of beams that can be processed by using each antenna panel of the terminal device includes a quantity of resources included in each downlink reference signal resource set of the terminal device, or a quantity of resources included in each uplink reference signal resource set of the terminal device.

According to a third aspect, a communications apparatus is provided. The communications apparatus is configured to perform the method in any one of the first aspect and the possible implementations of the first aspect. Specifically, the communications apparatus may include a module configured to perform the method in any one of the first aspect and the possible implementations of the first aspect.

According to a fourth aspect, a communications apparatus is provided. The communications apparatus is configured to perform the method in any one of the second aspect and the possible implementations of the second aspect. Specifically, the communications apparatus may include a module configured to perform the method in any one of the second aspect and the possible implementations of the second aspect.

According to a fifth aspect, a communications apparatus is provided. The communications apparatus includes a memory and a processor. The memory is configured to store an instruction, and the processor is configured to execute the instruction stored in the memory, so that the processor is enabled to perform the method in any one of the first aspect and the possible implementations of the first aspect.

According to a sixth aspect, a communications apparatus is provided. The communications apparatus includes a memory and a processor. The memory is configured to store an instruction, the processor is configured to execute the instruction stored in the memory, and execution of the instruction stored in the memory enables the processor to perform the method in any one of the second aspect and the possible implementations of the second aspect.

According to a seventh aspect, a chip is provided. The chip includes a processing module and a communications interface. The processing module is configured to control the communications interface to communicate with the outside, and the processing module is further configured to implement the method in any one of the first aspect and the possible implementations of the first aspect.

According to an eighth aspect, a chip is provided. The chip includes a processing module and a communications interface. The processing module is configured to control the communications interface to communicate with the outside, and the processing module is further configured to implement the method in any one of the second aspect and the possible implementations of the second aspect.

According to a ninth aspect, a computer readable storage medium is provided. The computer readable storage medium stores a computer program, and when the computer program is executed by a computer, the computer is enabled to implement the method in any one of the first aspect and the possible implementations of the first aspect.

According to a tenth aspect, a computer readable storage medium is provided. The computer readable storage medium stores a computer program, and when the computer program is executed by a computer, the computer is enabled to implement the method in any one of the second aspect and the possible implementations of the second aspect.

According to an eleventh aspect, a computer program product including an instruction is provided. When the instruction is executed by a computer, the computer is enabled to implement the method in any one of the first aspect and the possible implementations of the first aspect.

According to a twelfth aspect, a computer program product including an instruction is provided. When the instruction is executed by a computer, the computer is enabled to implement the method in any one of the second aspect and the possible implementations of the second aspect.

DESCRIPTION OF EMBODIMENTS

Figure 1:
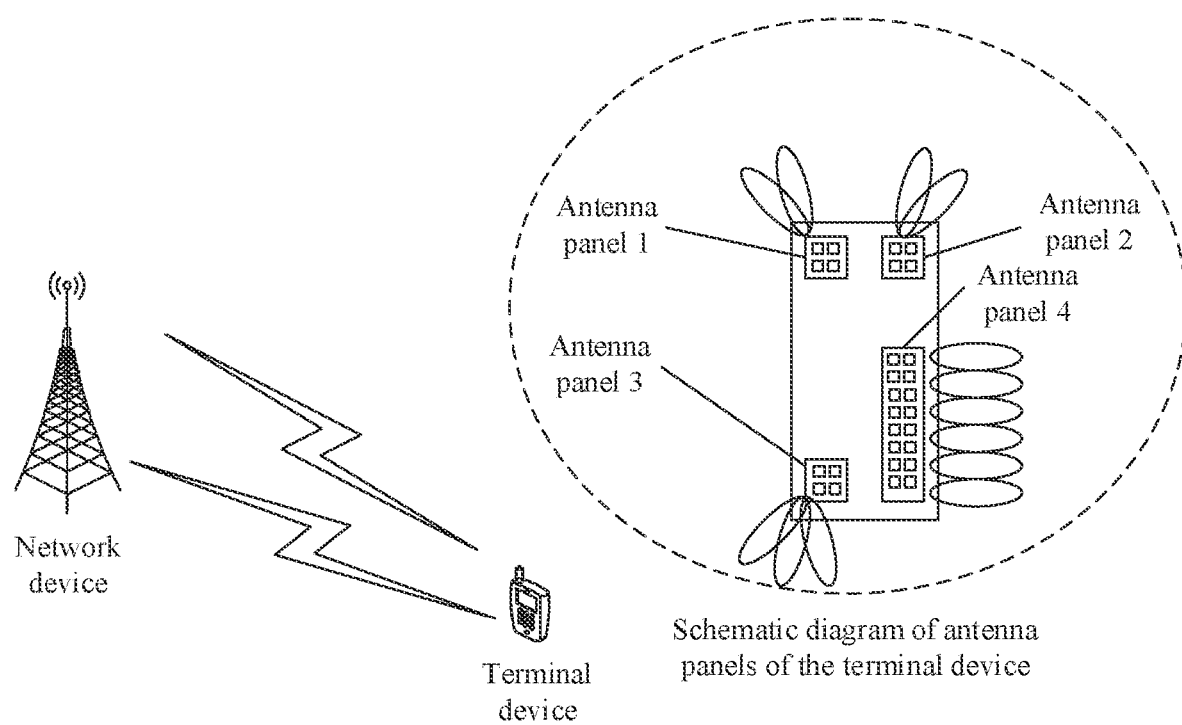
FIG. 1 is a schematic diagram of a scenario to which an embodiment of this application is applied.

The following describes technical solutions of this application with reference to the accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX)

communications system, and a future 5th generation (5G) system or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device that can communicate with the terminal device. The network device may be a base station, a relay station, or an access point. The network device may be a base transceiver station (BTS) in a global system for mobile communications (GSM) or a code division multiple access (CDMA) network, or may be an NB (NodeB) in wideband code division multiple access (WCDMA), or may be an eNB or an eNodeB (evolved NodeB) in long term evolution (LTE). The network device may alternatively be a radio controller in a cloud radio access network (CRAN) scenario. The network device may alternatively be a base station device in a future 5G network or a network device in a future evolved PLMN. The network device may alternatively be a wearable device or a vehicle-mounted device.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), or a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed by any computer readable component, carrier, or medium. For example, the computer readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine readable media that are configured to store information. The term "machine readable media" may include but is not limited to a wireless channel, and various other media that can store, include, and/or carry an instruction and/or data.

FIG. 1 is a schematic diagram of a scenario to which this application is applied.

As shown in FIG. 1, communication between a network device and a terminal device is implemented by using an antenna, that is, a signal is received and sent between the terminal device and the network device by using the antenna. Both the terminal device and the network device have antenna elements.

A plurality of antenna elements may be integrated on one panel, and the panel on which the antenna elements are integrated is referred to as an antenna panel (which may also be represented as a panel).

Each antenna panel may produce one or more beams. The beam is a communication resource. The beam may be a wide beam, a narrow beam, or a beam of another type. A technology for forming the beam may be a beamforming technology or another technology. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams having same or similar communication features may be considered as one beam. One beam may include one or more antenna ports, which are used to transmit a data channel, a control channel, a sounding signal, and the like. Beams may be classified into a transmit beam and a receive beam. For example, a transmit beam may be signal strength distribution formed in different directions in space after a signal is transmitted from an antenna, and a receive beam may be signal strength distribution in different directions in space of a radio signal received from an antenna. It should be understood that one or more antenna ports included in one beam may also be considered as one antenna port set. In a protocol, the beam may also be represented as a spatial filter.

In this application, the terminal device has a plurality of antenna panels. In FIG. 1, the terminal device has four antenna panels. The antenna panel 1 may produce (or output) two beams, the antenna panel 2 may produce two beams, the antenna panel 3 may produce four beams, and the antenna panel 4 may produce six beams. FIG. 1 is an example diagram of an antenna panel of a terminal device.

The network device may also have a plurality of antenna panels (not shown in FIG. 1).

If the terminal device sends an uplink signal to the network device by using a beam on an antenna panel, the antenna panel may be referred to as a transmit antenna panel of the terminal device. Correspondingly, a beam produced on the transmit antenna panel is referred to as a transmit beam. If the terminal device receives a downlink signal from the network device by using a beam on an antenna panel, the antenna panel may be referred to as a receive antenna panel of the terminal device. Correspondingly, a beam produced on the receive antenna panel is referred to as a receive beam.

The transmit antenna panel and the receive antenna panel of the terminal device may be a same antenna panel, or may be different antenna panels.

It should be noted that the antenna panel may also be represented as an antenna array or an antenna subarray. One antenna panel may include one or more antenna arrays/subarrays. One antenna panel may be controlled by one or more oscillators. One radio frequency circuit may drive one or more antenna elements on the antenna panel. Therefore, one antenna panel may be driven by one radio frequency link, or may be driven by a plurality of radio frequency links. The radio frequency link may also be referred to as a receive channel and/or a transmit channel, a receiver branch, or the like. Therefore, the antenna panel may alternatively be replaced with a radio frequency link, a plurality of radio frequency links that drive one antenna panel, or one or more radio frequency links that are controlled by one oscillator.

For ease of description and understanding, an antenna panel is used as an example for description in this specification. The antenna panel described in this specification may be replaced with a radio frequency link.

Figure 2:
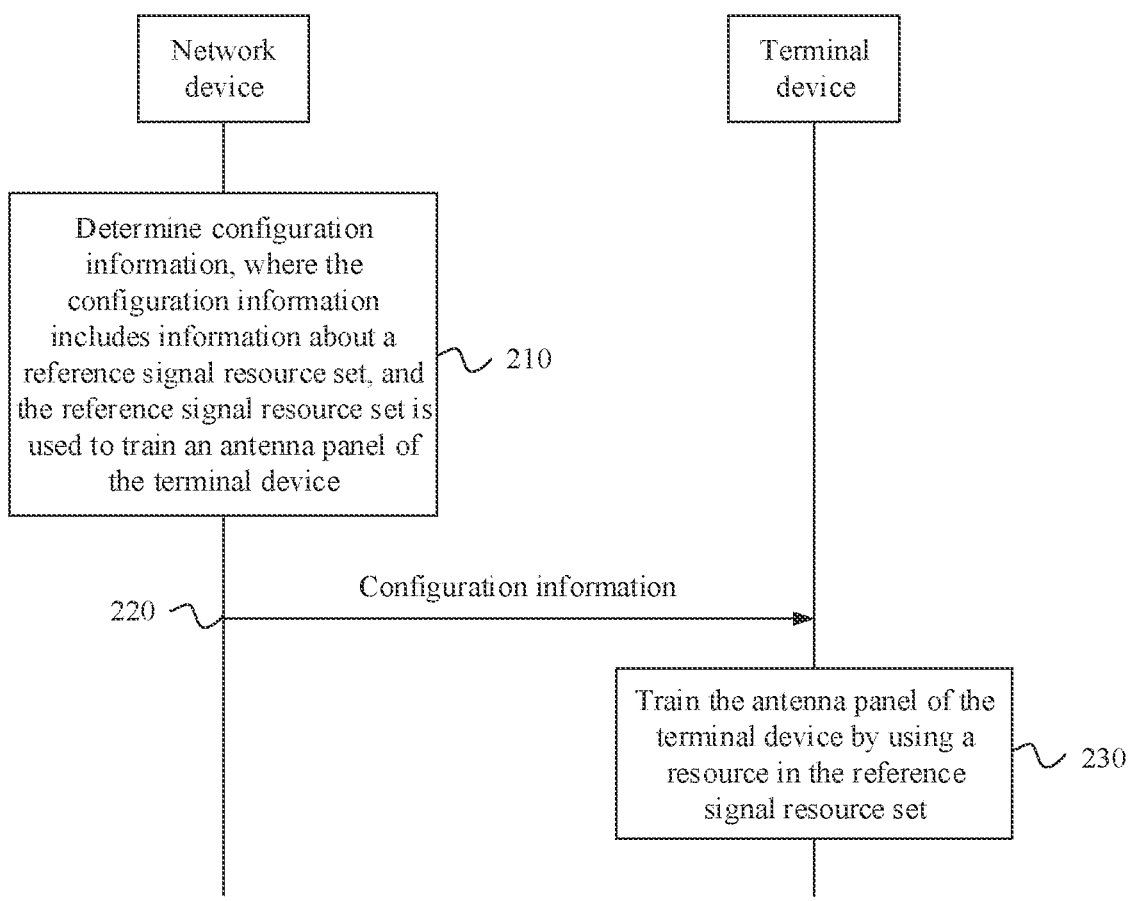
FIG. 2 is a schematic flowchart of an antenna panel training method according to an embodiment of this application.

FIG. 2 is a schematic flowchart of an antenna panel training method 200 according to an embodiment of this application. The method 200 includes the following steps.

210: A network device determines configuration information, where the configuration information includes information about a reference signal resource set, and the reference signal resource set is used to train an antenna panel of a terminal device.

The reference signal resource set used to train the antenna panel includes one or more reference signal resources. Alternatively, the reference signal resource set includes one or more reference signal resource sets, and one reference signal resource set represents a set of one or more resources including the reference signal.

Optionally, the reference signal resource set includes an uplink reference signal resource set and/or a downlink reference signal resource set.

The uplink reference signal resource set is represented as a resource used to calculate and measure quality of a beam produced on a transmit antenna panel of the terminal device. The downlink reference signal resource set is represented as a resource used to calculate and measure quality of a beam produced on a receive antenna panel of the terminal device.

For example, the uplink reference signal resource set includes the uplink reference signal and a resource used to transmit the uplink reference signal. The downlink reference signal resource set includes the downlink reference signal and a resource used to transmit the downlink reference signal.

It should be understood that, if the reference signal resource set configured by the network device includes an uplink reference signal resource set, the terminal device may train a transmit antenna panel (or a transmit beam) by using the uplink reference signal resource set. If the reference signal resource set includes a downlink reference signal resource set, the terminal device may train a receive antenna panel (or a receive beam) by using the downlink reference signal resource set.

The uplink reference signal mentioned in this specification may be any one of the following: an uplink random access sequence, an uplink sounding reference signal (SRS), an uplink control channel demodulation reference signal, an uplink data channel demodulation reference signal, an uplink phase noise tracking signal, and an uplink random access signal.

The downlink reference signal mentioned in this specification may be any one of the following: a synchronization signal (SS), a physical broadcast channel (PBCH), a downlink channel measurement reference signal, a broadcast channel demodulation signal, a channel state information reference signal (CSI-RS), a cell-specific reference signal (CS-RS), a UE-specific reference signal (US-RS), a downlink control channel demodulation reference signal, a downlink data channel demodulation reference signal, a downlink phase noise tracking signal, or a downlink shared channel demodulation reference signal.

220: The network device sends the configuration information to the terminal device.

The network device may send the configuration information to the terminal device by using one or more pieces of downlink signaling.

The signaling mentioned in this specification may be any one of the following: RRC signaling, MAC-CE signaling, downlink control information (DCI) signaling, and a combination thereof.

The signaling mentioned in this specification may alternatively include broadcast channel information, a system message, a system message update, and a remaining system message.

The signaling mentioned in this specification may alternatively be preconfigured in a protocol.

A method for notifying the terminal device by the network device is not limited in this application.

A manner in which the terminal device reports a signal to the network device is not limited in this application either. For example, the terminal device may report a signal to the network device by using a UE capability reporting message, a higher layer message, a MAC-CE message, uplink control information (UCI), and a combination thereof.

230: The terminal device receives the configuration information, and the terminal device trains the antenna panel of the terminal device by using a resource in the reference signal resource set.

In this embodiment of this application, the network device configures the reference signal resource set for the terminal device, so that the terminal device can train the antenna panel of the terminal device based on the reference signal resource set, thereby managing a plurality of antenna panels of the terminal device.

Optionally, in this specification, the beam may also be referred to as a spatial domain transmission filter, the transmit beam may also be referred to as a spatial domain transmit filter, and the receive beam may also be referred to as a spatial domain receive filter.

Information used to indicate a beam used to transmit a signal may be referred to as beam indication information. The beam indication information includes at least one of the following: a beam number, a beam management resource number, an uplink signal resource number, a downlink signal resource number, an absolute index of a beam, a relative index of the beam, a logical index of the beam, an index of an antenna port corresponding to the beam, an index of an antenna port group corresponding to the beam, an index of a downlink signal corresponding to the beam, a time index of a downlink synchronization signal block corresponding to the beam, beam pair link (BPL) information, a transmit parameter (Tx parameter) corresponding to the beam, a receive parameter (Rx parameter) corresponding to the beam, a transmit weight corresponding to the beam, a weight matrix corresponding to the beam, a weight vector corresponding to the beam, a receive weight corresponding to the beam, an index of the transmit weight corresponding to the beam, an index of the weight matrix corresponding to the beam, an index of the weight vector corresponding to the beam, an index of the receive weight corresponding to the beam, a receive codebook corresponding to the beam, a transmit codebook corresponding to the beam, an index of the receive codebook corresponding to the beam, and an index of the transmit codebook corresponding to the beam. The downlink signal includes any one of the following: a synchronization signal, a broadcast channel, a broadcast channel demodulation signal, a channel state information reference signal (CSI-RS), a cell-specific reference signal (CS-RS), a UE-specific reference signal (US-RS), a downlink control channel demodulation reference signal, a downlink data channel demodulation reference signal, and a downlink phase noise tracking signal. The uplink signal includes any one of the following: an uplink random access sequence, an uplink sounding reference signal (SRS), an uplink control channel demodulation reference signal, an uplink data channel demodulation reference signal, and an uplink phase noise tracking signal.

The beam indication information may alternatively be represented as a transmission configuration indicator (TCI), and the TCI may include a plurality of parameters, for example, a cell number, a bandwidth part number, a reference signal identifier, a synchronization signal block identifier, and quasi-coloration (QCL) type.

Optionally, the network device may further assign a QCL identifier to beams having a quasi-colocation (QCL) relationship in beams associated with a frequency resource group.

A QCL relationship is used to indicate that a plurality of resources have one or more same or similar communication features. For a plurality of resources having a QCL relationship, same or similar communication configurations may be used. For example, if two antenna ports have a QCL relationship, a large-scale channel property in which one port transmits one symbol may be inferred from a large-scale channel property in which the other port transmits one symbol. The large-scale property may include a delay spread, an average delay, a Doppler spread, a Doppler frequency shift, an average gain, a receive parameter, a receive beam number of the terminal device, a transmit/receive channel correlation, an angle of arrival, a spatial correlation of a receiver antenna, a dominant angle of arrival (AoA), an average angle of arrival, a dominant angle of arrival spread, and the like.

QCL also includes spatial quasi-colocation (spatial QCL). Spatial QCL may be considered as a type of QCL. Spatial quasi-colocation may be understood from two perspectives: a transmit end and a receive end. From the perspective of the transmit end, if two antenna ports are in spatial quasi-colocation, it means that beam directions corresponding to the two antenna ports are spatially consistent. From the perspective of the receive end, if two antenna ports are in spatial quasi-co-location, it means that the receive end can receive, in a same beam direction, signals sent from the two antenna ports.

For QCL, there is a concept of quasi-colocation assumption (QCL assumption). Quasi-colocation assumption means that it is assumed whether there is a QCL relationship between two ports. A configuration and an indication of quasi-colocation assumption may be used to help a receive end to receive and demodulate a signal. For example, the receive end can determine that there is a QCL relationship between a port A and a port B. In other words, a large-scale parameter of a signal obtained through measurement on the port A may be used to measure and demodulate a signal on the port B.

Optionally, the reference signal resource set used to train the antenna panel may also be referred to as an antenna panel management resource or a beam management resource.

The beam management resource is a resource used for beam management, and may also be represented as a resource used to calculate and measure beam quality. The beam quality includes layer 1 reference signal received power (L1-RSRP), layer 1 reference signal received quality (L1-RSRQ), and the like.

For example, the beam management resource may include a synchronization signal (SS), a physical broadcast channel (PBCH), a downlink channel measurement reference signal, a tracking signal, a downlink control channel demodulation reference signal, a downlink shared channel demodulation reference signal, an uplink sounding reference signal, and an uplink random access signal.

The reference signal resource set configured by the network device for the terminal device includes one or more reference signal resource sets, and one reference signal resource set is used to train one antenna panel of the terminal device.

The network device may determine, based on a quantity of antenna panels of the terminal device, a quantity of reference signal resource sets included in the reference signal resource set. For example, the quantity of reference signal resource sets included in the reference signal resource set is equal to, greater than, or less than the quantity of antenna panels of the terminal device.

Optionally, the configuration information determined by the network device further includes first trigger information, and the first trigger information is used to activate each reference signal resource set in the reference signal resource set.

The terminal device may learn of, based on the first trigger information, a time for sending an SRS and a time for starting antenna panel training.

An example in which the reference signal is an SRS is used. It is assumed that the configuration information generated by the network device for the terminal device includes the following:

(a) one or more SRS resource sets, where each resource set includes one or more SRS resources (corresponding to the reference signal resource set); and (b) first trigger information used to trigger the one or more SRS resource sets.

For example, a trigger is designed for aperiodic transmission, and one trigger may activate transmission of one or more SRS resource sets. An offset is set for each SRS resource set.

Optionally, one trigger may activate transmission of one or more SRS resources in one or more SRS resource sets, and an offset is set for each SRS resource.

A specific configuration of each SRS resource set may be implemented by using the prior art, and details are not described in this specification.

Optionally, the configuration information determined by the network device for the terminal device further includes training mode information, and the training mode information is used to indicate a mode for training the antenna panel by the terminal device.

The mode for training the antenna panel by the terminal device includes at least one of the following: a single-antenna panel mode, a multi-antenna panel mode, or a specified-antenna panel mode.

Case 1: The training mode of the antenna panel of the terminal device is a single-antenna panel mode.

That the terminal device trains the antenna panel of the terminal device by using a resource in the reference signal resource set in step 230 includes: The terminal device trains a currently used antenna panel of the terminal device by using the resource in the reference signal resource set.

The currently used antenna panel of the terminal device is represented by any one of the following: an antenna panel of the terminal device that is currently in a power-on state, an antenna panel used by the terminal device to perform latest uplink transmission, a transmit antenna panel corresponding to a receive antenna panel used by the terminal device to perform latest downlink transmission, and a transmit antenna panel corresponding to a receive antenna panel used by the terminal device to receive a control channel.

Figure 3:
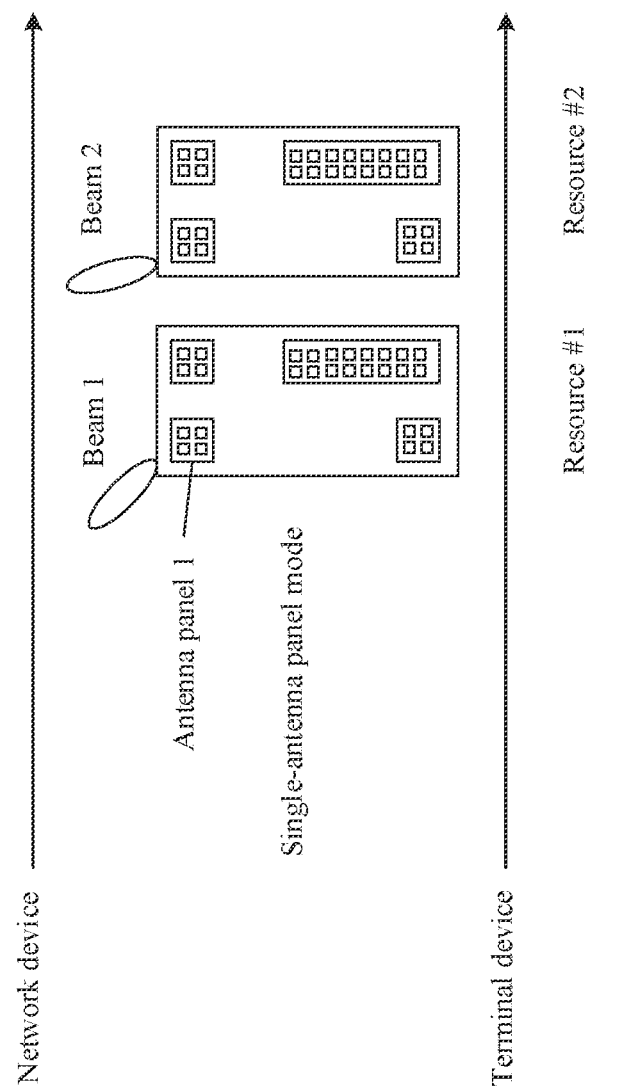
FIG. 3 is a schematic diagram of training an antenna panel on a terminal device side according to an embodiment of this application.

As shown in FIG. 3, assuming that the terminal device has four antenna panels, and a currently used antenna panel of the terminal device is the antenna panel 1, the terminal device receives a signal from the network device and sends a signal to the network device by using a beam (for example, two beams shown in FIG. 3) produced on the antenna panel 1.

For example, it may be further learned from FIG. 3 that the terminal device transmits a reference signal on a resource #1 by using a beam 1 produced on the currently used antenna panel, and the terminal device transmits a reference signal on a resource #2 by using a beam 2 produced on the currently used antenna panel. The resource #1 and the resource #2 herein are resources in the reference signal resource set configured by the network device.

The following describes how the terminal device trains a transmit antenna panel and a receive antenna panel in the single-antenna panel mode.

(1) Train the Transmit Antenna Panel

It is assumed that the reference signal resource set configured by the network device for the terminal device includes an uplink reference signal resource set, for example, an SRS resource set.

Step 230 includes the following steps: The terminal device sends an uplink reference signal to the network device by using a resource in the uplink reference signal resource set and by using a currently used antenna panel of the terminal device. The network device selects, based on the received uplink reference signal, an optimal transmit beam of the terminal device from beams included in the currently used antenna panel of the terminal device, The network device may select, based on beam quality, the optimal transmit beam of the terminal device from the beams included in the currently used antenna panel of the terminal device.

The beam quality mentioned in this specification includes layer 1 reference signal received power (L1-RSRP), layer 1 reference signal received quality (L1-RSRQ), and the like.

A measurement indicator for measuring beam quality is not limited in this application. Possible indicators include reference signal received power (RSRP), a block error rate (BLER), reference signal received quality (RSRQ), a received signal strength indicator (RSSI), a signal to interference plus noise ratio (SINR), a channel quality indicator (CQI) correlation, and the like.

A process of selecting an optimal beam from a plurality of beams based on beam quality is described in the prior art, and details are not described herein.

Optionally, there may be one or more optimal transmit beams.

(2) Train the Receive Antenna Panel

It is assumed that the reference signal resource set configured by the network device for the terminal device includes a downlink reference signal resource set, for example, a CSI-RS resource set.

Step 230 includes the following steps: The terminal device receives, by using a resource in the downlink reference signal resource set and by using a currently used antenna panel of the terminal device, a downlink reference signal delivered by the network device. The terminal device selects, based on the received downlink reference signal, an optimal receive beam from beams included in the currently used antenna panel.

The terminal device may select, based on beam quality, the optimal receive beam from the beams included in the currently used antenna panel.

Optionally, there may be one or more optimal receive beams.

In this embodiment of this application, the network device configures the single-antenna panel mode for the terminal device, so that the terminal device trains only the currently used antenna panel.

The single-antenna panel mode is applicable to a scenario in which the network device indicates the terminal device to find an optimal transmit beam or an optimal receive beam within a relatively small range when a transmit antenna panel or a receive antenna panel of the terminal device has been determined.

Case 2: The training mode of the antenna panel of the terminal device is a multi-antenna panel mode.

That the terminal device trains the antenna panel of the terminal device by using a resource in the reference signal resource set in step 230 includes: The terminal device trains all antenna panels of the terminal device by using the resource in the reference signal resource set.

Figure 4:
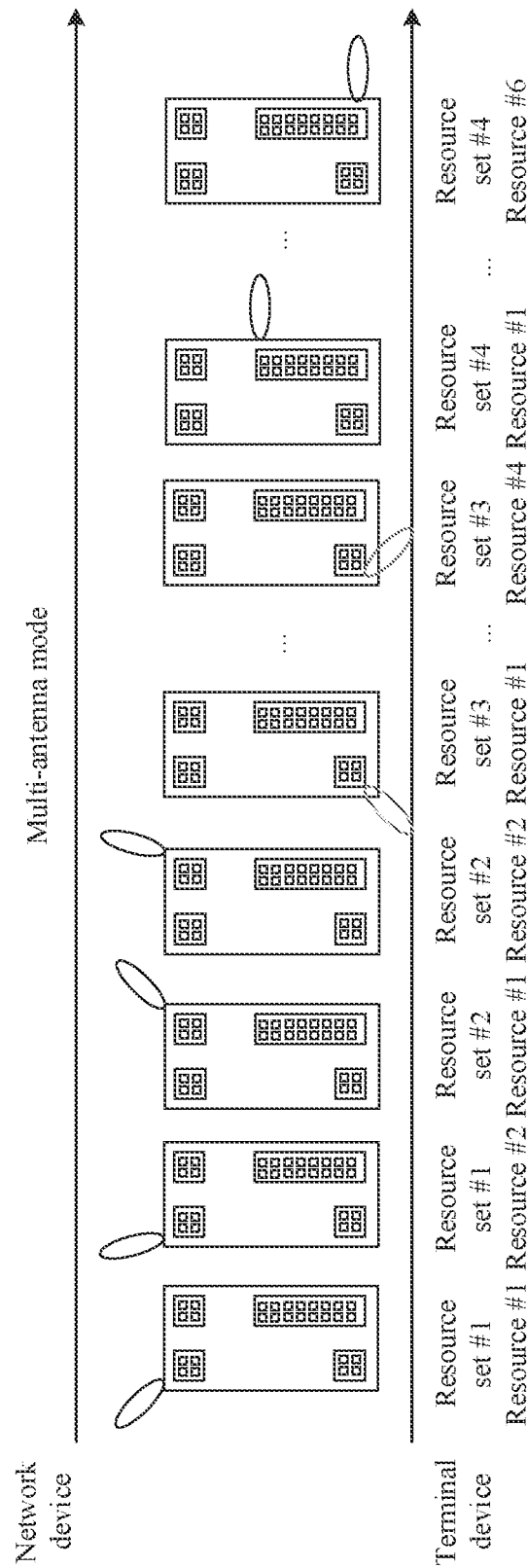
FIG. 4 is another schematic diagram of training an antenna panel on a terminal device side according to an embodiment of this application.

As shown in FIG. 4, assuming that the terminal device has four antenna panels, the terminal device separately communicates with the network device by using the four antenna panels, to train the four antenna panels.

For example, it may be further learned from FIG. 4 that the terminal device uses a beam on the antenna panel 1 on each resource in a resource set #1, uses a beam on the antenna panel 2 on each resource in a resource set #2, uses a beam on the antenna panel 3 on each resource in a resource set #3, and uses a beam on the antenna panel 4 on each resource in a resource set #4. The resource set #1, the resource set #2, the resource set #3, and the resource set #4 are resources included in the reference signal resource set configured by the network device for the terminal device.

The following describes how the terminal device trains a transmit antenna panel and a receive antenna panel in the multi-antenna panel mode.

(1) Train the Transmit Antenna Panel

It is assumed that the reference signal resource set configured by the network device for the terminal device includes an uplink reference signal resource set, for example, an SRS resource set, and a quantity of uplink reference signal resource sets included in the reference signal resource set is not less than a quantity of antenna panels of the terminal device.

Step 230 includes the following steps: The terminal device sends an uplink reference signal to the network device by using a resource in the uplink reference signal resource set and by using all antenna panels of the terminal device. The network device selects, based on the received uplink reference signal, an optimal transmit antenna panel of the terminal device from all the antenna panels of the terminal device.

The network device may select, based on beam quality, the optimal transmit antenna panel of the terminal device from all the antenna panels of the terminal device.

A principle of selecting an optimal antenna panel from a plurality of antenna panels is similar to a principle of selecting an optimal beam from a plurality of beams based on beam quality. For example, an antenna panel including an optimal comprehensive indicator of beam quality is determined as an optimal antenna panel. A process of selecting an optimal beam from a plurality of beams based on beam quality is described in the prior art, and details are not described herein.

Optionally, beam quality of a plurality of beams included in each of a plurality of antenna panels may be comprehensively considered. For example, an average value of the beam quality of the plurality of beams or a filtered value is used as an indicator to select an optimal antenna panel from the plurality of antenna panels.

Optionally, a quantity of optimal transmit antenna panels may be 1, or may be less than a quantity of all the antennas of the terminal device.

In this embodiment of this application, the network device can effectively obtain related information of the optimal transmit antenna panel of the terminal device by controlling training of the transmit antenna panel of the terminal device. During subsequent communication, the network device may indicate the terminal device to use only the optimal transmit antenna panel to perform uplink communication, so that power consumption of the terminal device can be reduced while communication quality is ensured.

(2) Train the Receive Antenna Panel

It is assumed that the reference signal resource set configured by the network device for the terminal device includes a downlink reference signal resource set, for example, a CSI-RS resource set, and a quantity of downlink reference signal resource sets included in the reference signal resource set is not less than a quantity of antenna panels of the terminal device.

Step 230 includes the following steps: The terminal device receives, by using a resource in the downlink reference signal resource set and by using all antenna panels of the terminal device, a downlink reference signal delivered by the network device. The terminal device selects, based on the received downlink reference signal, an optimal receive antenna panel from all the antenna panels of the terminal device.

The terminal device may select, based on beam quality, the optimal receive antenna panel from all the antenna panels of the terminal device.

Optionally, a quantity of optimal receive antenna panels may be 1, or may be less than a quantity of all the antenna antennas of the terminal device.

In the multi-antenna panel mode, the terminal device uses the antenna panels (specifically, beams produced on the antenna panels) in a specific sequence.

Optionally, the terminal device sequentially maps antenna panels to resource sets in descending order or ascending order of numbers of the antenna panels and numbers of the resource sets, and then the terminal device sequentially uses the antenna panels on the corresponding resource sets based on the correspondence.

Optionally, the configuration information delivered by the network device to the terminal device further includes a one-to-one correspondence between each resource set in the reference signal resource set and an antenna panel of the terminal device, and the terminal device sequentially uses the antenna panels on the corresponding resource sets based on the correspondence.

In the multi-antenna panel mode, in a scenario of training a transmit antenna of the terminal device, the method 200 further includes: The network device determines a time interval at which the uplink reference signal is sent by using different antenna panels of the terminal device. When the reference signal resource set is configured, a resource is designed, so that the time interval at which the uplink reference signal is sent by using different antenna panels of the terminal device is greater than a time required by the terminal device to switch between different antenna panels. Further, the network device sends, to the terminal device, the time interval at which the uplink reference signal is sent by using different antenna panels of the terminal device.

It should be understood that, when the time interval that is configured by the network device and at which the uplink reference signal is sent by using different antenna panels of the terminal device is less than the time required by the terminal device to switch between different antenna panels, the terminal device cannot switch between transmit antenna panels.

In the multi-antenna panel mode, in a scenario of training a receive antenna of the terminal device, the method 200 further includes: The network device determines a time interval at which the downlink reference signal is received by using different antenna panels of the terminal device. When the reference signal resource set is configured, a resource is designed, so that the time interval at which the downlink reference signal is received by using different antenna panels of the terminal device is greater than a time required by the terminal device to switch between different antenna panels. Further, the network device sends, to the terminal device, the time interval at which the downlink reference signal is received by using different antenna panels of the terminal device.

It should be understood that, when the time interval that is configured by the network device and at which the downlink reference signal is received by using different antenna panels of the terminal device is less than the time required by the terminal device to switch between different antenna panels, the terminal device cannot switch between receive antenna panels.

In this embodiment of this application, the network device configures the multi-antenna panel mode for the terminal device, so that the terminal device can train all the antenna panels of the terminal device.

The multi-antenna panel mode is applicable to a scenario in which an optimal antenna panel is selected from a plurality of antenna panels of the terminal device. For example, after the terminal device just accesses a network, not all the antenna panels of the terminal device have been trained. In this case, the multi-antenna panel mode needs to be used to train the antenna panels of the terminal device.

Case 3: The training mode of the antenna panel of the terminal device is a specified-antenna panel mode.

The specified-antenna panel mode means that the network device specifies an antenna panel in antenna panels of the terminal device that needs to be trained.

Step 230 includes: The terminal device trains, by using the resource in the reference signal resource set, one or more antenna panels of the terminal device that are specified by the network device.

In the specified-antenna panel mode, the network device needs to notify the terminal device of a specified antenna panel. The network device may notify the terminal device of the specified antenna panel in a plurality of manners.

Optionally, in a manner, the configuration information delivered by the network device to the terminal device further includes antenna panel indication information, and the antenna panel indication information indicates one or more antenna panels or one or more antenna panel groups of the terminal device. The antenna panel indicated by the antenna panel indication information is an antenna panel that is specified by the network device and that needs to be trained.

Optionally, the network device may deliver the antenna panel indication information to the terminal device by using separate downlink signaling.

Optionally, in another manner, indication information of one antenna panel is configured for each reference signal resource set in the reference signal resource set configured by the network device.

In other words, the network device indirectly specifies, by using the configured reference signal resource set, one or more antenna panels of the terminal device that need to be trained.

For example, the terminal device has antenna panels 1 to 4, and the reference signal resource set configured by the network device for the terminal device includes a resource set #1 and a resource set #2. Indication information of the antenna panel 1 is configured for the resource set #1, and indication information of the antenna panel 2 is configured for the resource set #2. In this case, the terminal device may learn, based on the reference signal resource set configured by the network device, that the antenna panel 1 and the antenna panel 2 need to be trained.

The following describes how the terminal device trains a transmit antenna panel and a receive antenna panel in the specified-antenna panel mode.

(1) Train the Transmit Antenna Panel

It is assumed that the reference signal resource set configured by the network device for the terminal device includes an uplink reference signal resource set, for example, an SRS resource set, and a quantity of uplink reference signal resource sets included in the reference signal resource set is not less than a quantity of antenna panels specified by the network device for training.

Step 230 includes the following steps: The terminal device sends an uplink reference signal to the network device by using a resource in the uplink reference signal resource set and by using one or more antenna panels specified by the network device. The network device selects, based on the received uplink reference signal, an optimal transmit antenna panel of the terminal device from the one or more antenna panels specified by the network device.

The network device may select, based on beam quality, the optimal transmit antenna panel of the terminal device from the one or more antenna panels specified by the network device.

Optionally, a quantity of optimal transmit antenna panel may be 1, or may be less than a quantity of the one or more antenna panels specified by the network device.

In this embodiment of this application, the network device can effectively obtain related information of the optimal transmit antenna panel of the terminal device by controlling training of the transmit antenna panel of the terminal device. During subsequent communication, the network device may indicate the terminal device to use only the optimal transmit antenna panel to perform uplink communication, so that power consumption of the terminal device can be reduced while communication quality is ensured.

(2) Train the Receive Antenna Panel

It is assumed that the reference signal resource set configured by the network device for the terminal device includes a downlink reference signal resource set, for example, a CSI-RS resource set, and a quantity of uplink reference signal resource sets included in the reference signal resource set is not less than a quantity of antenna panels specified by the network device.

Step 230 includes the following steps: The terminal device receives, by using a resource in the downlink reference signal resource set and by using one or more antenna panels specified by the network device, a downlink reference signal delivered by the network device. The terminal device selects, based on the received downlink reference signal, an optimal receive antenna panel from the one or more antenna panels specified by the network device.

The terminal device may select, based on beam quality, the optimal receive antenna panel from the one or more antenna panels specified by the network device.

Optionally, a quantity of optimal receive antenna panels may be 1, or may be less than a quantity of the one or more antenna panels specified by the network device.

In the specified-antenna panel mode, if the network device specifies a plurality of antenna panels, the terminal device sequentially uses the specified antenna panels (specifically, beams produced on the antenna panels) in a specific time sequence.

When the network device notifies, by delivering the antenna panel indication information to the terminal device, the terminal device of an antenna panel that needs to be trained, the terminal device sequentially maps specified antenna panels to resource sets in descending or ascending order of numbers of the specified antenna panels and numbers of the resource sets, and then the terminal device sequentially uses the specified antenna panels on the corresponding resource sets based on the correspondence.

When the network device indirectly specifies, by using the configured reference signal resource set, an antenna panel of the terminal device that needs to be trained, the terminal device may directly determine, based on a correspondence between a resource set and a specified antenna panel, a time sequence for using the specified antenna panels.

In the specified-antenna panel mode, if the network device specifies a plurality of antenna panels, the network device further needs to configure a time interval at which the reference signal is sent on different antenna panels or a time interval at which the reference signal is received on different antenna panels to be greater than a time required by the terminal device to switch between different antenna panels. Further, the network device sends, to the terminal device, the time interval at which the uplink reference signal is sent on different antenna panels or the time interval at which the downlink reference signal is received on different antenna panels.

In this embodiment of this application, the network device configures the specified-antenna panel mode for the terminal device, so that the terminal device trains only the antenna panel specified by the network device.

In the solution provided in this application, the network device configures a plurality of antenna panel training modes for the terminal device, so that the terminal device can train an antenna panel of the terminal device in different scenarios by using a relatively appropriate training mode, thereby flexibly training and managing a plurality of antenna panels of the terminal device.

The foregoing describes the three training modes of the antenna panel that are configured by the network device for the terminal device. However, this application is not limited thereto. During actual application, more other training modes may be designed based on a specific requirement. These solutions also fall within the protection scope of this application.

The network device may indicate the training mode information to the terminal device explicitly or implicitly.

Optionally, the network device sends downlink signaling to the terminal device. The downlink signaling includes an "antenna panel training mode" field, and the "antenna panel training mode" field carries any one of the foregoing three pieces of training mode information.

Optionally, the network device indirectly indicates the training mode information to the terminal device by using the configured reference signal resource set.

When the reference signal resource set configured by the network device includes only one reference signal resource set, it indicates that the training mode is the single-antenna panel mode. For example, when the network device configures only one SRS resource set and/or one CSI-RS resource set, it indicates that the training mode is the single-antenna panel mode.

When a quantity of reference signal resource sets included in the reference signal resource set configured by the network device is equal to a quantity of antenna panels of the terminal device, it indicates that the training mode is the multi-antenna panel mode. For example, when a quantity of SRS resource sets configured by the network device and/or a quantity of CSI-RS resource sets configured by the network device are/is equal to the quantity of antenna panels of the terminal device, it indicates that the training mode is the multi-antenna panel mode.

When antenna panel indication information is configured for each reference signal resource set in the reference signal resource set configured by the network device, it indicates that the training mode is the specified-antenna panel mode.

In the above described embodiment, the terminal device trains the transmit antenna panel of the terminal device based on the uplink reference signal resource set configured by the network device, and trains the receive antenna panel of the terminal device based on the downlink reference signal resource set. This application further proposes that the transmit antenna panel of the terminal device is trained by using both the downlink reference signal resource set and the uplink reference signal resource set, and the receive antenna panel of the terminal device is trained by using both the downlink reference signal resource set and the uplink reference signal resource set.

Optionally, in some embodiments, the reference signal resource set configured by the network device for the terminal device includes the uplink reference signal resource set and the downlink reference signal resource set, and the configuration information delivered by the network device to the terminal device further includes second trigger information. The second trigger information is used to indicate a binding relationship between the downlink reference signal resource set and the uplink reference signal resource set, and/or is used to notify the terminal device of a time difference, and the time difference represents a time interval between a time at which the terminal device receives the last symbol in the downlink reference signal and a time at which the terminal device sends the first symbol in the uplink reference signal, or the time difference represents a time interval between a time at which the terminal device sends the last symbol in the uplink reference signal and a time at which the terminal device receives the first symbol in the downlink reference signal.

For example, the configuration information determined by the network device includes the following information (a), (b), and (c):

(a) one or more SRS resource sets, where each SRS resource set includes one or more SRS resources (corresponding to the uplink reference signal resource set);

(b) one or more CSI-RS resource sets, where each CSI-RS resource set includes one or more CSI-RS resources (corresponding to the downlink reference signal resource set); and (c) an association relationship between an SRS resource set and a CSI-RS resource set, where the association relationship includes a joint trigger by an SRS resource set and a CSI-RS resource set, that is, an SRS resource set and a CSI-RS resource set that are bound to implement antenna panel training, and the association relationship further includes a time difference between an SRS resource set and a CSI-RS resource set that are bound in one group, that is, a time period for which the terminal device needs to wait to send the first symbol in the SRS (corresponding to the second trigger information) after receiving the last symbol in the CSI-RS, where the symbol mentioned herein may be an orthogonal frequency division multiplexing (OFDM) symbol or a slot symbol.

The following describes a method for training a transmit antenna panel and a receive antenna panel of the terminal device by using both the uplink reference signal resource set and the downlink reference signal resource set that are configured by the network device.

Optionally, in this embodiment, in step 230, the terminal device trains the transmit antenna panel of the terminal device by using both the uplink reference signal resource set and the downlink reference signal resource set that are configured by the network device. Specifically, step 230 includes steps of training the transmit antenna panel of the terminal device shown in FIG. 5.

510: The network device sends the downlink reference signal to the terminal device by using a resource in the downlink reference signal resource set.

Figure 6:
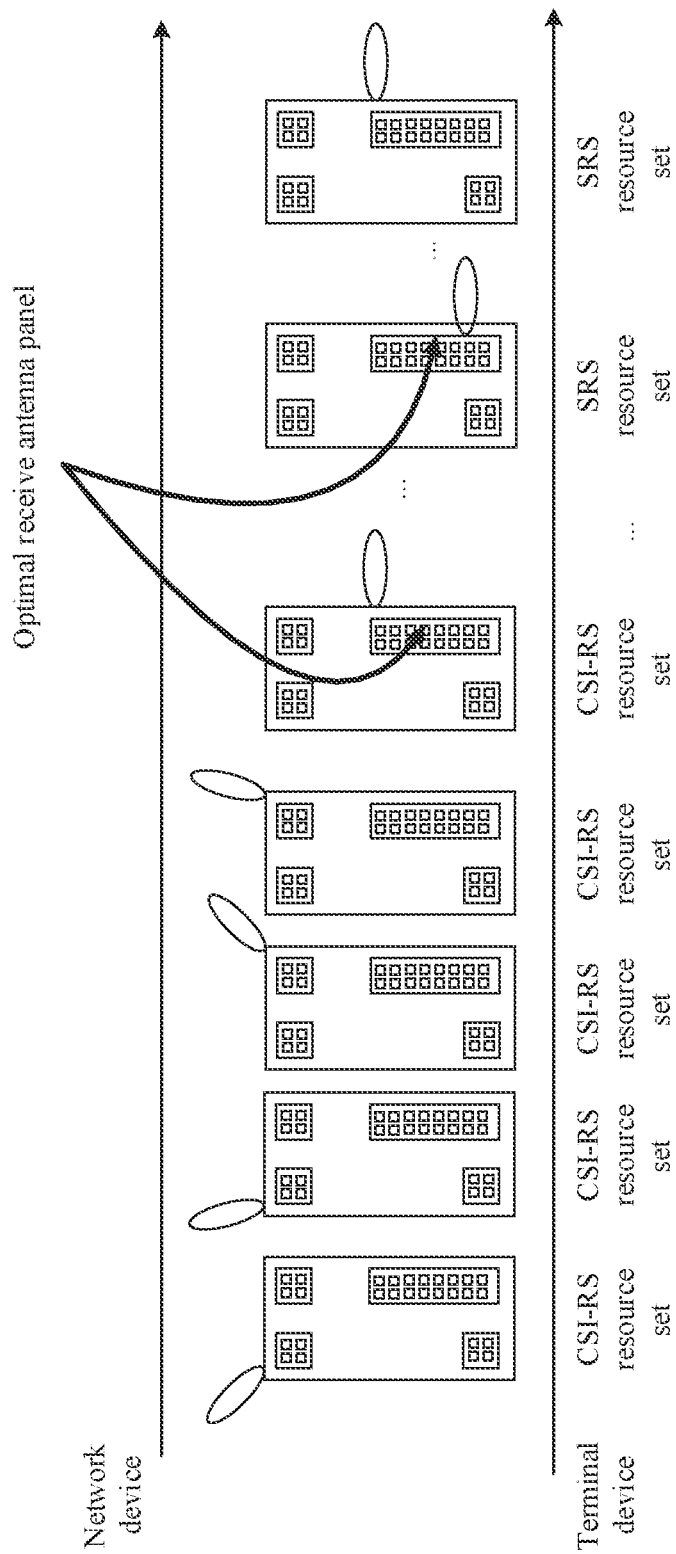
FIG. 6 is still another schematic diagram of training an antenna panel on a terminal device side according to an embodiment of this application.

As shown in FIG. 6, the terminal device has four antenna panels, and the network device configures a CSI-RS resource set (that is, the downlink reference signal resource set) and an SRS resource set (that is, the uplink reference signal resource set) for the terminal device. The network device sends the CSI-RS to the terminal device by using the CSI-RS resource set.

520: The terminal device obtains an optimal antenna panel of the terminal device by using the received downlink reference signal.

FIG. 6 is still used as an example. The terminal device receives, by using the CSI-RS resource set and by using the four antenna panels, the CSI-RSs sent by the network device. For example, the optimal antenna panel is selected from the four antenna panels based on quality of each received CSI-RS. In FIG. 6, the optimal antenna panel is the antenna panel 4.

530: The terminal device sends the uplink reference signal to the network device by using a resource in the uplink reference signal resource set and by using the optimal antenna panel.

Specifically, the terminal device learns of, from the second trigger information configured by the network device, a time interval (denoted as a time interval T1) between a time at which the terminal device receives the last symbol in the downlink reference signal and a time at which the terminal device sends the first symbol in the uplink reference signal. After receiving the downlink reference signal, the terminal device starts to send the uplink reference signal to the network device after the time interval T1.

FIG. 6 is still used as an example. The terminal device sends the SRS to the network device by using the SRS resource set and by using the optimal antenna panel, that is, the antenna panel 4.

540: The network device selects an optimal beam from beams on the optimal antenna panel of the terminal device by using the received uplink reference signal.

FIG. 6 is still used as an example. The network device receives the SRS sent by the terminal device. For example, the network device selects the optimal beam from the beams on the optimal antenna panel, that is, the antenna panel 4, based on quality of each received SRS.

It should be understood that step 510 and step 520 correspond to the above described multi-antenna panel mode, and step 530 and step 540 correspond to the above described single-antenna panel mode.

The network device may indicate the terminal device to use the optimal antenna panel or the optimal beam during subsequent uplink communication.

Optionally, in this embodiment, in step 230, the terminal device trains the receive antenna panel of the terminal device by using both the uplink reference signal resource set and the downlink reference signal resource set that are configured by the network device.

Specifically, step 230 includes the following steps of training the receive antenna panel of the terminal device: The terminal device sends the uplink reference signal to the network device by using a resource in the uplink reference signal resource set. The network device obtains an optimal antenna panel of the terminal device by using the received uplink reference signal. The network device sends the downlink reference signal to the terminal device by using a resource in the downlink reference signal resource set and by using beams on the optimal antenna panel. The terminal device selects an optimal beam from the beams on the optimal antenna panel of the terminal device by using the received downlink reference signal.

That the terminal device receives the downlink reference signal sent by the network device includes: The terminal device learns of, from the second trigger information configured by the network device, a time interval (denoted as a time interval T2) between a time at which the terminal device sends the last symbol in the uplink reference signal and a time at which the terminal device receives the first symbol in the downlink reference signal. After sending the uplink reference signal, the terminal device starts to receive, after the time interval T2, the downlink reference signal sent by the network device.

The terminal device may further report the determined optimal beam to the network device, so that the network device uses the optimal beam during subsequent downlink communication, and the terminal device can receive a signal by using the optimal beam.

In this embodiment of this application, the transmit antenna panel of the terminal device is trained by using both the uplink reference signal and the downlink reference signal, so that both an optimal transmit antenna and an optimal transmit beam can be selected, thereby reducing power consumption of the terminal device while ensuring communication quality.

The foregoing describes that the transmit antenna panel of the terminal device is trained based on the uplink reference signal resource set configured by the network device, the receive antenna panel of the terminal device is trained based on the downlink reference signal resource set configured by the network device, the transmit antenna panel (or the transmit beam) of the terminal device is trained by using both the uplink reference signal resource set and the downlink reference signal resource set that are configured by the network device, and the receive antenna panel (or the receive beam) of the terminal device is trained by using both the uplink reference signal resource set and the downlink reference signal resource set that are configured by the network device.

When beam consistency exists, a beam pair for downlink beam training (sent by the network device and received by the terminal device) may also be used for uplink transmission (sent by the terminal device and received by the network device). Beam consistency means that directionality of a receive channel and a transmit channel can be controlled within a specific error range. To be specific, if a radio frequency channel sends a signal towards a direction in a sending mode, when the radio frequency channel is in a receiving mode, the radio frequency channel can also receive a signal in a same direction. Therefore, when beam consistency exists, only the receive antenna panel or the transmit antenna panel of the terminal device needs to be trained, and there is no need to train both the receive antenna panel and the transmit antenna panel.

To enable the network device to learn of an antenna panel-related capability of the terminal device, and better configure a reference signal resource set used for antenna panel training for the terminal device based on the capability, the terminal device may further report the antenna panel-related capability of the terminal device to the network device.

Optionally, in some embodiments, the method 200 further includes: The terminal device sends antenna panel capability information to the network device, where the antenna panel capability information is used to indicate an antenna panel-related capability of the terminal device. The antenna panel capability information is used to indicate at least one of a capability 1 to a capability 9.

The capability 1 is a quantity of antenna panels of the terminal device, where the quantity of antenna panels of the terminal device includes a quantity of transmit antenna panels of the terminal device, and/or a quantity of receive antenna panels of the terminal device.

For example, the quantity of antenna panels of the terminal device is {1-8}, where {1-8} indicates any integer from 1 to 8. For example, when the quantity of antenna panels of the terminal device is {4}, it indicates that the terminal device has four antenna panels.

For another example, the quantity of transmit antenna panels of the terminal device is {1-8}, and/or the quantity of receive antenna panels of the terminal device is {1-8}.

The capability 2 is a quantity of receive antenna panels or transmit antenna panels that can be simultaneously used by the terminal device.

The capability 3 is a quantity of beams that can be processed by using each antenna panel of the terminal device, where the quantity of beams that can be processed by using each antenna panel of the terminal device includes a quantity of beams that can be received by using each receive antenna panel of the terminal device, or a quantity of beams that can be sent by using each transmit antenna panel of the terminal device.

The capability 4 is a quantity of receive antenna panel groups of the terminal device, and/or a quantity of receive antenna panels included in each receive antenna panel group and/or identifiers of the receive antenna panels.

For example, there are two receive antenna panel groups of the terminal device in total, and each group includes two receive antenna panels. The receive antenna panels #1 and #2 are in the group 1, and the receive antenna panels #3 and #4 are in the group 2.

The capability 5 is a quantity of transmit antenna panel groups of the terminal device, and/or a quantity of transmit antenna panels included in each transmit antenna panel group and/or identifiers of the transmit antenna panels.

For example, there are two transmit antenna panel groups of the terminal device in total, and each group includes two transmit antenna panels. The transmit antenna panels #1 and #2 are in the group 1, and the transmit antenna panels #3 and #4 are in the group 2.

The capability 6 is at least one of the following capabilities of the terminal device to switch between receive antenna panels: a time interval at which the terminal device switches between receive antenna panels, and a quantity of times that the terminal device switches between receive antenna panels within a preset time period.

For example, the time interval at which the terminal device switches between receive antenna panels is 14 or 28 OFDM symbol duration, one or two slots, or 0.25 or 0.5 millisecond (ms).

For another example, a maximum quantity of times that the terminal device switches between receive antenna panels within one slot is 2, 4, 7, or 14.

It should be noted that a time unit of a time concept (for example, the time interval) mentioned in this embodiment of this application may be an absolute time, for example, a millisecond, or may be a relative time, for example, one or more symbols, one or more slots, or one or more frames. This is not limited in this application.

The capability 7 is at least one of the following capabilities of the terminal device to switch between transmit antenna panels: a time interval at which the terminal device switches between transmit antenna panels, and a quantity of times that the terminal device switches between transmit antenna panels within a preset time period.

For example, the time interval at which the terminal device switches between transmit antenna panels is 14 or 28 OFDM symbol duration, one or two slots, or 0.25 or 0.5 millisecond (ms).

For another example, a maximum quantity of times that the terminal device switches between transmit antenna panels within one slot is 7 or 14.

The capability 8 is at least one of the following capabilities of the terminal device to switch from a receive antenna panel to a transmit antenna panel: a time interval at which the terminal device switches from a receive mode to a transmit mode when the receive antenna panel and the transmit antenna panel are a same antenna panel, a time interval at which the terminal device switches from a receive mode to a transmit mode when the receive antenna panel and the transmit antenna panel are different antenna panels, a quantity of times that the terminal device switches from a receive mode to a transmit mode on a same antenna panel within a preset time period, and a quantity of times that the terminal device switches from a receive mode to a transmit mode on different antenna panels within a preset time period. The capability is at least one of the following capabilities of the terminal device to switch between transmit antenna panels: a time interval at which the terminal device switches between transmit antenna panels, and a quantity of times that the terminal device switches between transmit antenna panels within a preset time period.

The capability 9 is at least one of the following capabilities of the terminal device to switch from a transmit antenna panel to a receive antenna panel: a time interval at which the terminal device switches from a transmit mode to a receive mode when the receive antenna panel and the transmit antenna panel are a same antenna panel, a time interval at which the terminal device switches from a transmit mode to a receive mode when the receive antenna panel and the transmit antenna panel are different antenna panels, a quantity of times that the terminal device switches from a transmit mode to a receive mode on a same antenna panel within a preset time period, and a quantity of times that the terminal device switches from a transmit mode to a receive mode on different antenna panels within a preset time period.

It should be understood that the terminal device reports the antenna panel-related capability to the network device, so that the network device configures a relatively appropriate reference signal resource set for the terminal device.

For example, the network device may determine a quantity of resource sets in the reference signal resource set based on the quantity of antenna panels of the terminal device. Specifically, the network device may determine a quantity of uplink reference signal resource sets based on the quantity of transmit antenna panels of the terminal device, or may determine a quantity of downlink reference signal resource sets based on the quantity of receive antenna panels of the terminal device.

For another example, the network device may determine a quantity of resources included in each resource set in the reference signal resource set based on the quantity of beams included in each antenna panel of the terminal device.

For another example, when a plurality of antenna panels of the terminal device are trained, the network device may determine, based on the capability (for example, the above described capability 6, 7, 8, or 9) of the terminal device to switch between antenna panels, a time interval between resource sets corresponding to different antenna panels of the terminal device, so that the time interval is greater than or equal to a switching time interval that can be supported by the terminal device. If the time interval is less than the switching time interval that can be supported by the terminal device, the terminal device cannot switch between antenna panels.

In this embodiment of this application, the terminal device reports the antenna panel-related capability to the network device, so that the network device can accurately obtain information about an antenna panel on a terminal device side, thereby helping the network device manage a plurality of antenna panels of the terminal device, for example, a quantity of resources that are configured for the terminal device to perform antenna panel management and beam management, or a method for configuring a time interval between resources used for antenna panel/beam training.

The network device may learn of information about an optimal transmit antenna panel of the terminal device based on the antenna panel-related capability reported by the terminal device, to ensure uplink transmission performance. In addition, the network device may indicate the terminal device to use an optimal antenna panel to perform uplink transmission. Compared with the prior art in which the terminal device always opens a plurality of antenna panels, the solution in this application can effectively reduce power consumption of the terminal device.

Specifically, the terminal device may report the antenna panel-related capability of the terminal device to the network device explicitly or implicitly.

Optionally, the antenna panel capability information sent by the terminal device to the network device directly represents the at least one of the capability 1 to the capability 9.

Optionally, the antenna panel capability information sent by the terminal device to the network device includes indirect indication information used to indirectly indicate the at least one of the capability 1 to the capability 9. For example, the indirect indication information includes related information such as an uplink/downlink reference signal resource, resource set, resource setting, or group.

Optionally, the antenna panel capability information includes indication information of a quantity of antenna panels of the terminal device, and the indication information of the quantity of antenna panels of the terminal device includes at least one of the following information: a quantity of beam groups of the terminal device, a quantity of uplink reference signal resource sets of the terminal device, and a quantity of downlink reference signal resource sets of the terminal device.

For example, beam grouping means that the terminal device groups transmit beams of the network device based on a receiving capability of the terminal device. For example, the terminal device may group a plurality of transmit beams of the network device that can be received by the terminal device on a same antenna panel into one group. In this case, a quantity of groups is a quantity of receive antenna panels of the terminal device.

For another example, beam grouping means that the terminal device groups transmit beams of the terminal device. For example, the terminal device may group a plurality of transmit beams that can be sent by the terminal device on a same antenna panel into one group. In this case, a quantity of groups is a quantity of transmit antenna panels of the terminal device.

The quantity of uplink reference signal resource sets of the terminal device is, for example, a quantity of SRS resource sets.

Optionally, the quantity of SRS resource sets of the terminal device may be a quantity of SRS resource sets used for antenna panel management. For example, it is defined that SRS Set Use=panel management.

Optionally, the quantity of SRS resource sets of the terminal device may be a quantity of SRS resource sets used for beam management. For example, it is defined that SRS Set Use=beam management.

It should be understood that the quantity of uplink reference signal resource sets of the terminal device is designed to indicate the quantity of transmit antenna panels of the terminal device, so that the terminal device can send one or more uplink reference signals in a same uplink reference signal resource set by using a same antenna panel. It should be further understood that, when uplink transmission and downlink transmission of the terminal device are symmetric, the quantity of uplink reference signal resource sets of the terminal device may further indicate the quantity of receive antenna panels of the terminal device.

The quantity of downlink reference signal resource sets of the terminal device is, for example, a quantity of CSI-RS resource sets.

Optionally, the quantity of CSI-RS resource sets of the terminal device may be a quantity of CSI-RS resource sets used for antenna panel management. For example, it is defined that CSI-RS Set Use=panel management.

Optionally, the quantity of CSI-RS resource sets of the terminal device may be a quantity of CSI-RS resource sets used for beam management. For example, it is defined that CSI-RS Set Use=beam management.

Optionally, the antenna panel capability information includes indication information of a quantity of beams that can be processed by using each antenna panel of the terminal device, and the indication information of the quantity of beams that can be processed by using each antenna panel of the terminal device includes a quantity of resources included in each downlink reference signal resource set of the terminal device, or a quantity of resources included in each uplink reference signal resource set of the terminal device.

For example, the quantity of resources included in each downlink reference signal resource set of the terminal device is a quantity of SRS resources in each SRS resource set of the terminal device.

For another example, the quantity of resources included in each uplink reference signal resource set of the terminal device is a quantity of CSI-RS resources in each CSI-RS resource set of the terminal device.

In this embodiment of this application, the network device may learn of information about an optimal transmit antenna panel of the terminal device based on the antenna panel-related capability reported by the terminal device, to ensure uplink transmission performance. In addition, the network device may indicate the terminal device to use an optimal antenna panel to perform uplink transmission. Compared with the prior art in which the terminal device always opens a plurality of antenna panels, the solution in this application can effectively reduce power consumption of the terminal device.

In this embodiment of this application, the terminal device reports the antenna panel-related capability of the terminal device to the network device, so that the network device can configure an appropriate network configuration for the terminal device based on the capability of the terminal device. For example, the appropriate network configuration should not exceed the antenna panel-related capability of the terminal device.

For example, after obtaining the antenna, panel-related capability of the terminal device, the network device configures an appropriate network configuration for the terminal device, so that the network configuration does not exceed the capability of the terminal device.

In other words, reporting of the antenna panel-related capability of the terminal device may be considered as a manner in which the terminal device requests a resource from the network device.

For example, when the terminal device reports that the terminal device has four transmit antenna panels, the network device should configure four SRS resource sets for the terminal device, so that the terminal device performs uplink antenna panel training.

For another example, when the terminal device reports that each antenna panel may output eight beams, each SRS resource set configured by the network device and used for antenna panel training may include eight SRS resources.

Optionally, the network device may initiate a terminal device capability request, and after receiving the request, the terminal device reports an antenna panel-related capability of the terminal device to the network device.

Optionally, when the antenna panel-related capability of the terminal device changes, the request may be triggered, to report an updated antenna panel-related capability to the network device.

It should be understood that, if a network configuration is inappropriate, the terminal device may regulate behavior of the terminal device in an inappropriate configuration based on the antenna panel-related capability (and the capability 1 to the capability 9 described above) of the terminal device, to avoid confusion of the terminal device.

For example, when a quantity of times (for example, five times) that the terminal device switches between antenna panels within one slot configured by the network device exceeds a switching capability (for example, four times) reported by the terminal device, the terminal device may abandon antenna panel switching that exceeds the capability (that is, does not perform fifth switching).

When a quantity of receive antenna panels and a quantity of transmit antenna panels of the terminal device do not match, a concept of an antenna panel pair may be introduced, that is, one receive antenna panel and one or more transmit antenna panels are bound as one pair, or one transmit antenna panel and one or more receive antenna panels are bound as one antenna panel.

A receive antenna panel and a transmit antenna panel that are included in one antenna panel pair may be notified by the network device to the terminal device, or may be notified by the terminal device to the network device.

An embodiment of this application further provides an antenna panel management method. The method includes: A terminal device sends antenna panel capability information to a network device, where the antenna panel capability information is used to indicate an antenna panel-related capability of the terminal device. The network device sends configuration information to the terminal device, where the configuration information includes information about a reference signal resource set, and the reference signal resource set is used to train an antenna panel of the terminal device.

Optionally, the configuration information may be determined based on the antenna panel capability information. For example, the information about the reference signal resource set in the configuration information is determined based on the antenna panel capability information.

Optionally, the antenna panel capability information in this embodiment may indicate any one or more of the foregoing capabilities of the terminal device.

Optionally, the reference signal resource set in this embodiment may include one or more reference signal resource sets.

Optionally, the reference signal resource set in this embodiment may include an uplink reference signal resource set and/or a downlink reference signal resource set.

Optionally, the configuration information in this embodiment may further include any one or more of the training mode information, the antenna panel indication information, the first trigger information, and the second trigger information described above.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between network elements. It may be understood that, to implement the foregoing functions, the network elements such as a transmit end device or a receive end device include corresponding hardware structures and/or software modules for performing the functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, a transmit end device or a receive end device may be divided into function modules based on the foregoing method examples. For example, the transmit end device or the receive end device may be divided into function modules corresponding to functions, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used. An example in which the transmit end device or the receive end device is divided into function modules based on functions is used below for description.

An embodiment of this application further provides a first communications apparatus. The first communications apparatus may be a terminal device or a chip. The first communications apparatus may be configured to perform actions performed by the terminal device in the foregoing method embodiments.

Figure 7:
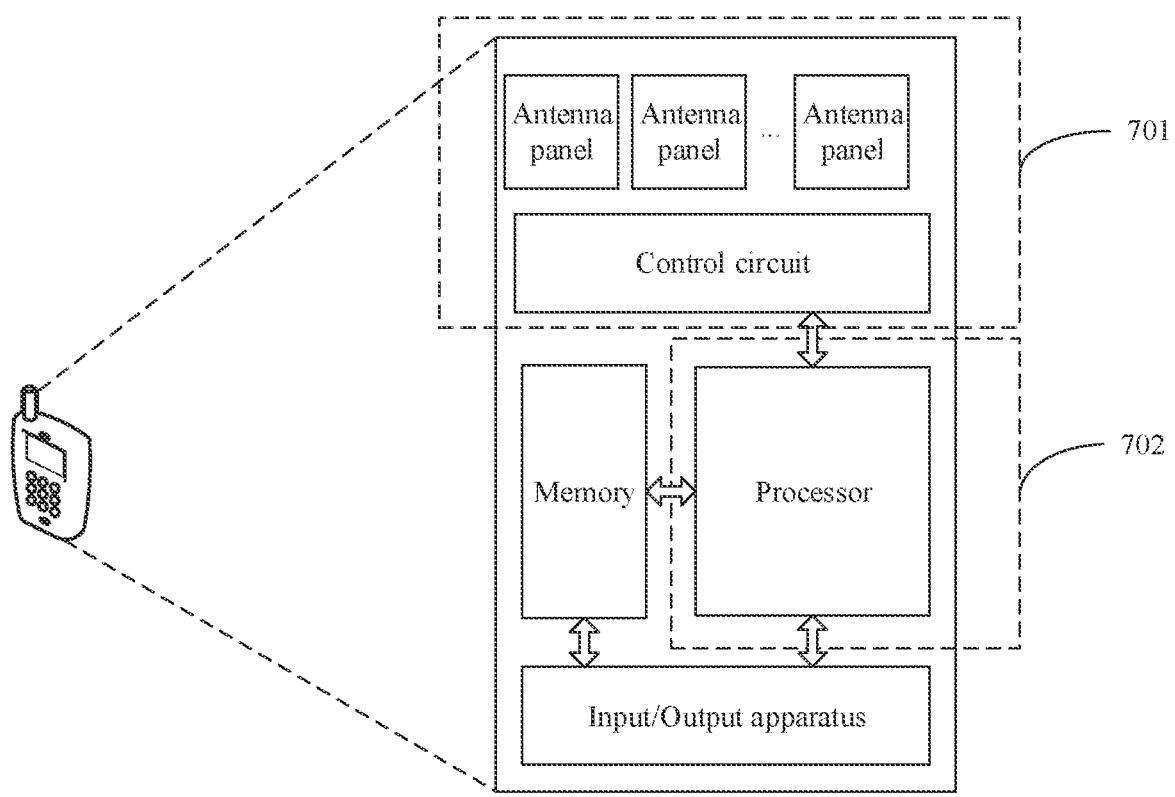
FIG. 7 is a schematic block diagram of a communications apparatus according to an embodiment of this application.

When the first communications apparatus is a terminal device, FIG. 7 is a simplified schematic structural diagram of a terminal device. For ease of understanding and illustration, an example in which the terminal device is a mobile phone is used in FIG. 7. As shown in FIG. 7, the terminal device includes a processor, a memory, a radio frequency circuit, a plurality of antenna panels, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The plurality of antenna panels are mainly configured to receive and send a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, the processor outputs a baseband signal to the radio frequency circuit after performing baseband processing on the to-be-sent data. After performing radio frequency processing on the baseband signal, the radio frequency circuit sends a radio frequency signal in a form of an electromagnetic wave by using an antenna element on the antenna panel. When data is sent to the terminal device, the radio frequency circuit receives a radio frequency signal by using the antenna element on the antenna panel, converts the radio frequency signal into a baseband signal, and outputs the baseband signal to the processor. The processor converts the baseband signal into data, and processes the data. For ease of description, FIG. 7 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, the antenna panel and the radio frequency circuit that have receiving and sending functions may be considered as a transceiver unit of the terminal device, and the processor that has a processing function may be considered as a processing unit of the terminal device. As shown in FIG. 7, the terminal device includes a transceiver unit 701 and a processing unit 702. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 701 and that is configured to implement a receiving function may be considered as a receiving unit, and a component that is in the transceiver unit 701 and that is configured to implement a sending function may be considered as a sending unit. In other words, the transceiver unit 701 includes a receiving unit and a sending unit. The transceiver unit may also be sometimes referred to as a transceiver, a transceiver machine, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the transceiver unit 701 is configured to perform a receiving operation on the terminal device side in step 220 or receiving and sending operations on the terminal device side in step 230 in FIG. 2, and/or the transceiver unit 701 is further configured to perform other receiving and sending steps on the terminal device side in the embodiments of this application. The processing unit 702 is configured to perform a processing action in step 230 in FIG. 2, and/or the processing unit 702 is further configured to perform another processing step on the terminal device side in the embodiments of this application.

Figure 5:
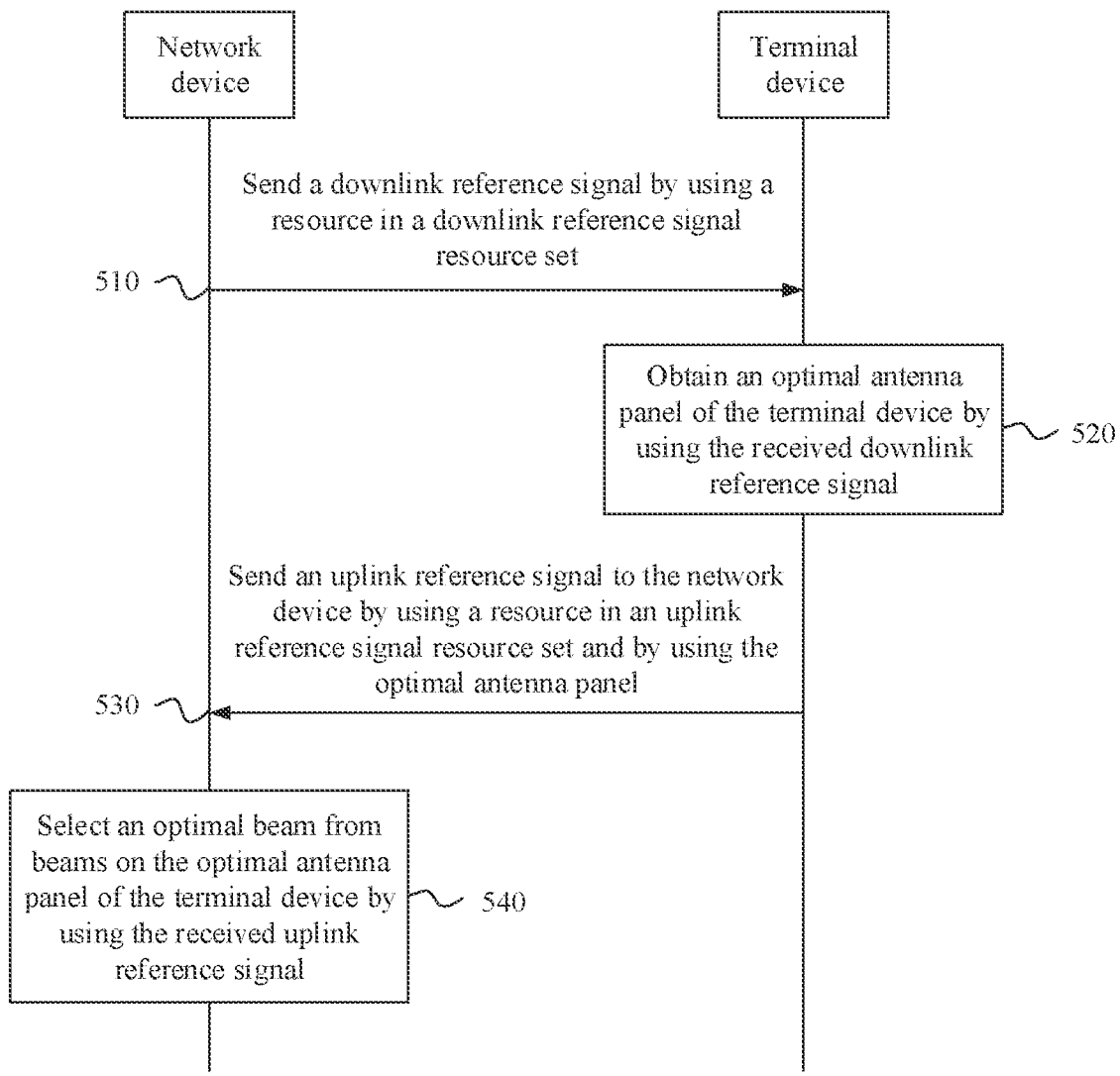
FIG. 5 is another schematic flowchart of an antenna panel training method according to an embodiment of this application.

For another example, in another implementation, the transceiver unit 701 is configured to perform a receiving operation on the terminal device side in step 510 or a sending operation on the terminal device side in step 530 in FIG. 5, and/or the transceiver unit 701 is further configured to perform other receiving and sending steps on the terminal device side in the embodiments of this application. The processing unit 702 is configured to perform step 520 in FIG. 5, and/or the processing unit 702 is further configured to perform another processing step on the terminal device side in the embodiments of this application.

When the first communications apparatus is a chip, the chip includes a transceiver unit and a processing unit. The transceiver unit may be an input/output circuit or a communications interface. The processing unit is a processor, a microprocessor, or an integrated circuit integrated on the chip.

An embodiment of this application further provides a second communications apparatus. The second communications apparatus may be a network device or a chip. The second communications apparatus may be configured to perform actions performed by the network device in the foregoing method embodiments.

Figure 8:
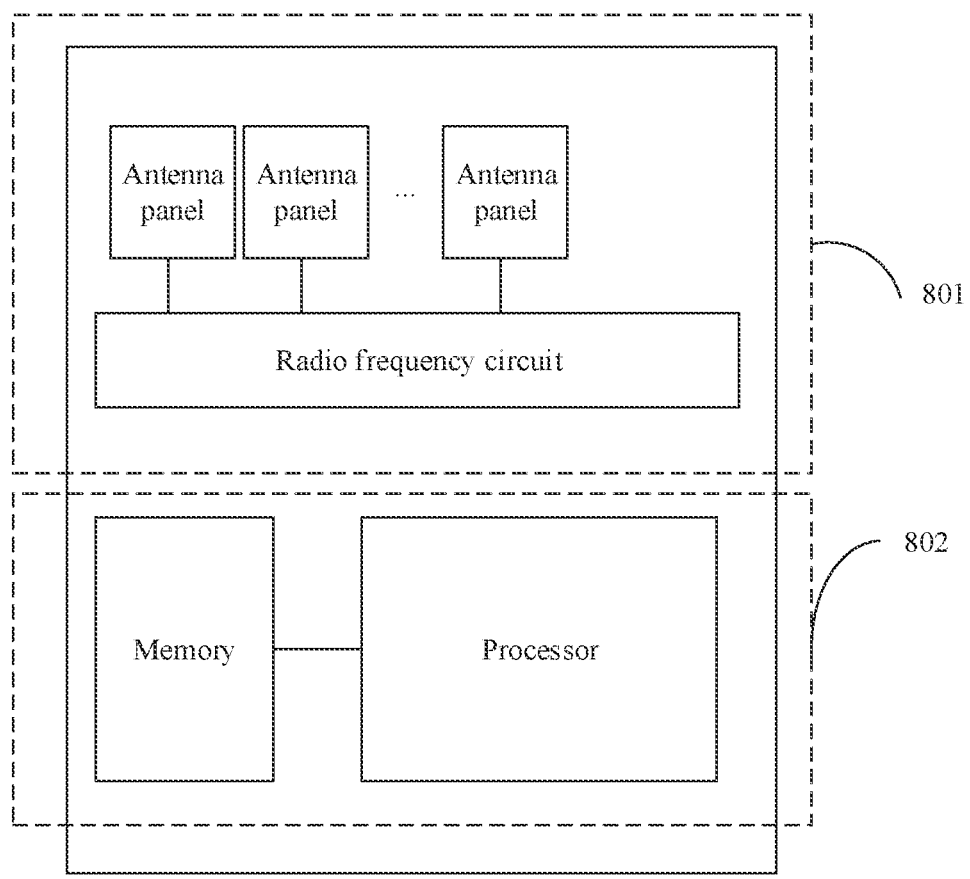
FIG. 8 is a schematic block diagram of another communications apparatus according to an embodiment of this application.

When the second communications apparatus is a network device, specifically, for example, a base station, FIG. 8 is a simplified schematic structural diagram of a base station. The base station includes a part 801 and a part 802. The part 801 is mainly configured to: receive and send a radio frequency signal, and perform conversion between a radio frequency signal and a baseband signal. The part 802 is mainly configured to: perform baseband processing, control the base station, and the like. The part 801 may be usually referred to as a transceiver unit, a transceiver machine, a transceiver circuit, a transceiver, or the like. The part 802 is usually a control center of the base station, and may be usually referred to as a processing unit, and is configured to control the base station to perform an action of generating a first message by the network device in the foregoing method embodiments. For details, refer to descriptions in the foregoing related parts.

The transceiver unit in the part 801 may also be referred to as a transceiver machine, a transceiver, or the like, and includes a plurality of antenna panels and a radio frequency unit. The radio frequency unit is mainly configured to perform radio frequency processing. Optionally, a component that is in the part 801 and that is configured to implement a receiving function may be considered as a receiving unit, and a component that is in the part 801 and that is configured to implement a sending function may be considered as a sending unit. In other words, the part 801 includes a receiving unit and a sending unit. The receiving unit may also be referred to as a receiver machine, a receiver, a receiver circuit, or the like. The sending unit may also be referred to as a transmitter machine, a transmitter, a transmitter circuit, or the like.

The part 802 may include one or more boards. Each board may include one or more processors and one or more memories. The processor is configured to read and execute a program in the memory, to implement a baseband processing function and control the base station. If there are a plurality of boards, the boards may be interconnected to improve a processing capability. In an optional implementation, a plurality of boards may share one or more processors, or a plurality of boards share one or more memories.

For example, in an implementation, the transceiver unit is configured to perform a sending operation on the network device side in step 220 in FIG. 2, and/or the transceiver unit is further configured to perform other receiving and sending steps on the network device side in the embodiments of this application. The processing unit is configured to perform an action in step 210, and/or the processing unit is further configured to perform another processing step on the network device side in the embodiments of this application.

For another example, in another implementation, the transceiver unit is configured to perform a sending operation on the network device side in step 510 in FIG. 5, a receiving operation on the network device side in step 530 in FIG. 5, and/or another step in this application. The processing unit is configured to perform step 540 in FIG. 5.

When the second communications apparatus is a chip, the chip includes a transceiver unit and a processing unit. The transceiver unit may be an input/output circuit or a communications interface. The processing unit is a processor, a microprocessor, or an integrated circuit integrated on the chip.

For explanations and beneficial effects of related content of either of the communications apparatuses provided above, refer to corresponding method embodiments provided above. Details are not described herein again.

It should be understood that the processor mentioned in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example and not limitation, many forms of RAMS may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that such an implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, may be located at one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network device, comprising:
    at least one processor; and
    one or more memories coupled to the at least one processor and storing programming instructions for execution by the at least one processor, the programming instructions instructing the at least one processor to:
    determine configuration information that comprises information about a reference signal resource set for training an antenna panel of a terminal device and antenna panel indication information indicating information about an antenna panel that needs to be trained; and
    send the configuration information to the terminal device.

2. The network device according to claim 1, wherein the configuration information further comprises training mode information indicating a training mode of the antenna panel of the terminal device.

3. The network device according to claim 2, wherein the training mode of the antenna panel of the terminal device comprises at least one of the following: a single-antenna panel mode, a multi-antenna panel mode, or a specified-antenna panel mode.

4. The network device according to any one of claim 1, wherein the reference signal resource set comprises a plurality of reference signal resource sets, and each of the plurality of reference signal resource sets is used to train one antenna panel of the terminal device.

5. The network device according to claim 1, wherein the configuration information further comprises first trigger information for activating the reference signal resource set.

6. The network device according to claim 1, wherein the reference signal resource set comprise at least one of an uplink reference signal resource set or a downlink reference signal resource set.

7. The network device according to claim 6, wherein the reference signal resource set comprises an uplink reference signal resource set, and the programming instructions instructing the at least one processor to:
 send, to the terminal device, a time interval at which an uplink reference signal is sent by using different antenna panels of the terminal device, wherein the time interval is greater than a time required by the terminal device to switch between different antenna panels.

8. The network device according to claim 6, wherein the reference signal resource set comprises a downlink reference signal resource set and an uplink reference signal resource set, and the configuration information further comprises second trigger information, wherein the second trigger information indicates a binding relationship between the downlink reference signal resource set and the uplink reference signal resource set, and is used to notify the terminal device of a time difference, and the time difference represents:
 (1) a time interval between a time at which the terminal device receives a last symbol in a downlink reference signal and a time at which the terminal device sends a first symbol in an uplink reference signal, or
 (2) a time interval between a time at which the terminal device sends a last symbol in the uplink reference signal and a time at which the terminal device receives a first symbol in the downlink reference signal.

9. A terminal device, comprising:
 at least one processor; and
 one or more memories coupled to the at least one processor and storing programming instructions for execution by the at least one processor, the programming instructions instructing the at least one processor to:
 obtain configuration information from a network device that comprises information about a reference signal resource set for training an antenna panel of the terminal device and antenna panel indication information indicating information about an antenna panel that needs to be trained; and
 train the antenna panel of the terminal device by using a resource in the reference signal resource set.

10. The terminal device according to claim 9, wherein the configuration information further comprises training mode information indicating a training mode of the antenna panel of the terminal device.

11. The terminal device according to claim 10, wherein the training mode of the antenna panel of the terminal device comprises at least one of the following: a single-antenna panel mode, a multi-antenna panel mode, or a specified-antenna panel mode.

12. The terminal device according to claim 9, wherein the reference signal resource set comprises one or more reference signal resource sets, and each of the one or more reference signal resource sets is used to train one antenna panel of the terminal device.

13. The terminal device according to claim 9, wherein the configuration information further comprises first trigger information for activating the reference signal resource set.

14. The terminal device according to claim 9, wherein the reference signal resource set comprise at least one of an uplink reference signal resource set or a downlink reference signal resource set.

15. The terminal device according to claim 14, wherein the reference signal resource set comprises an uplink reference signal resource set, and the programming instructions instructing the at least one processor to:
 obtain, from the network device, a time interval at which an uplink reference signal is sent by using different antenna panels of the terminal device, wherein the time interval is greater than a time required by the terminal device to switch between different antenna panels.

16. The terminal device according to claim 14, wherein the reference signal resource set comprises a downlink reference signal resource set and an uplink reference signal resource set, and the configuration information further comprises second trigger information, wherein the second trigger information indicates a binding relationship between the downlink reference signal resource set and the uplink reference signal resource set, and is used to notify the terminal device of a time difference, and the time difference represents:
 (1) a time interval between a time at which the terminal device receives a last symbol in a downlink reference signal and a time at which the terminal device sends a first symbol in an uplink reference signal, or
 (2) a time interval between a time at which the terminal device sends a last symbol in the uplink reference signal and a time at which the terminal device receives a first symbol in the downlink reference signal.

17. The terminal device according to claim 16, the programming instructions further instructing the at least one processor to:
 receive the downlink reference signal sent by the network device by using a resource in the downlink reference signal resource set;
 obtain an optimal antenna panel of the terminal device by using the received downlink reference signal; and
 send the uplink reference signal by using a resource in the uplink reference signal resource set and by using the optimal antenna panel of the terminal device.

18. A method comprising:
 determining, by a network device, configuration information that comprises information about a reference signal resource set for training an antenna panel of a terminal device and antenna panel indication information indicating information about an antenna panel that needs to be trained; and
 sending, by the network device, the configuration information to the terminal device.

19. The method according to claim 18, wherein the configuration information further comprises training mode information indicating a training mode of the antenna panel of the terminal device.

20. The method according to claim 19, wherein the training mode of the antenna panel of the terminal device comprises at least one of the following: a single-antenna panel mode, a multi-antenna panel mode, or a specified-antenna panel mode.

* * * * *